(12) United States Patent
Black et al.

(10) Patent No.: US 12,054,261 B2
(45) Date of Patent: Aug. 6, 2024

(54) ACTIVE VIBRATION CONTROL OF FLOOR AND SEAT FRAME VIBRATION

(71) Applicant: LORD Corporation, Cary, NC (US)

(72) Inventors: Paul Black, Apex, NC (US); David Newton, Holly Springs, NC (US); Douglas Swanson, Cary, NC (US)

(73) Assignee: LORD Corporation, Cary, NC (US)

( * ) Notice: Subject to any disclaimer, the term of this patent is extended or adjusted under 35 U.S.C. 154(b) by 920 days.

(21) Appl. No.: 16/959,341

(22) PCT Filed: Jan. 4, 2019

(86) PCT No.: PCT/US2019/012292
§ 371 (c)(1),
(2) Date: Jun. 30, 2020

(87) PCT Pub. No.: WO2019/212606
PCT Pub. Date: Nov. 7, 2019

(65) Prior Publication Data
US 2021/0047043 A1 Feb. 18, 2021

Related U.S. Application Data

(60) Provisional application No. 62/664,314, filed on Apr. 30, 2018.

(51) Int. Cl.
*B64D 11/06* (2006.01)
*B64C 27/00* (2006.01)
*F16F 15/00* (2006.01)

(52) U.S. Cl.
CPC ........ *B64D 11/0619* (2014.12); *B64C 27/001* (2013.01); *F16F 15/002* (2013.01);
(Continued)

(58) Field of Classification Search
CPC ............. B64D 11/0619; B64C 27/001; B64C 2027/004; F16F 15/002; F16F 2230/08; F16F 2230/18
See application file for complete search history.

(56) References Cited

U.S. PATENT DOCUMENTS 3,701,499 A 10/1972 Schubert et al.
5,000,415 A 3/1991 Sandercock
(Continued)

OTHER PUBLICATIONS

Indian Office Action for Application No. 202017035937 dated Apr. 16, 2021.
(Continued)

*Primary Examiner* — Rodney A Butler
(74) *Attorney, Agent, or Firm* — KDW FIRM PLLC

(57) ABSTRACT

An active vibration control system (AVCS) and method for reducing motion and/or vibration of a seat frame within an aircraft includes vibration sensors, a controller, and force generators. In some embodiments, the vibration sensors and/or the force generators are attached to the seat frames. In other embodiments, the vibration sensors and/or the force generators are attached to aircraft structures, proximate to the seat frame. By monitoring the motion and/or vibration of the seat frame, the controller calculates a cancelling force to be generated by the force generators to reduce the vibration experienced by the seat frame and its occupant. Such seat frame vibration control can be implemented as a separate AVCS in an aircraft, or can be integrated in an existing AVCS that is also configured to provide vibration control in other parts thereof.

37 Claims, 21 Drawing Sheets

(52) U.S. Cl.
CPC ..... *B64C 2027/004* (2013.01); *F16F 2230/08* (2013.01); *F16F 2230/18* (2013.01)

(56) References Cited

U.S. PATENT DOCUMENTS

| | | | |
|---|---|---|---|
| 5,207,408 A | 5/1993 | Burg | |
| 5,390,543 A | 2/1995 | Staple et al. | |
| 5,765,800 A | 6/1998 | Watanabe et al. | |
| 5,845,236 A | 12/1998 | Jolly et al. | |
| 5,954,169 A | 9/1999 | Jensen | |
| 6,137,886 A | 10/2000 | Shoureshi | |
| 6,189,836 B1 | 2/2001 | Gold et al. | |
| 6,467,723 B1* | 10/2002 | Rossetti | B64C 27/001 244/17.11 |
| 7,090,300 B2 | 8/2006 | Fujita | |
| 7,416,256 B2 | 8/2008 | Fujita et al. | |
| 7,958,801 B2 | 6/2011 | Frederickson | |
| 8,033,600 B2 | 10/2011 | Reynolds et al. | |
| 8,090,482 B2 | 1/2012 | Jolly et al. | |
| 8,360,387 B2 | 1/2013 | Breen et al. | |
| 8,775,019 B2 | 7/2014 | Okamoto et al. | |
| 9,061,767 B2 | 6/2015 | Rojas et al. | |
| 2006/0237885 A1 | 10/2006 | Paillard et al. | |
| 2015/0307186 A1 | 10/2015 | Swanson et al. | |
| 2015/0321752 A1* | 11/2015 | Trull | B64C 27/001 188/1.11 E |
| 2015/0346739 A1 | 12/2015 | Swanson et al. | |
| 2016/0083098 A1 | 3/2016 | Lucas et al. | |
| 2016/0150313 A1 | 5/2016 | Howard et al. | |
| 2016/0348749 A1 | 12/2016 | Carcaterra et al. | |
| 2017/0008620 A1 | 1/2017 | Swanson et al. | |
| 2017/0067530 A1 | 3/2017 | Swanson | |
| 2017/0088257 A1 | 3/2017 | Heverly et al. | |

OTHER PUBLICATIONS

Stein, GJ, "Results of investigation of an electropneumatic active vibration control system for a driver's seat," Institute of Materials and Machine Mechanics, Slovak Academy of Sciences, Bratislava, Slovak Republic, (1994).

Frechin et al., "ACTISEAT: active vehicle seat for acceleration Compensation," Department of Mechanical Engineering University of Saragossa, Spain, (2004).

Wickramasinghe, Viresh Kanchana, "Dynamics Control Approaches to Improve Vibratory Environment of the Helicopter Aircrew," Ottawa-Carleton Institute for Mechanical and Aerospace Engineering, (2012).

Du et al., "Vibration control of vehicle seat integrating with chassis suspension and driver body model," Advances in Structural Engineering, (2013).

Tatavolu et al., "Embedded Computer Based Active Vibration Control System for Vibration Reduction of Flexible Structures," Journal of Computer Science 9, (2013).

Yao, Wu-Sung, "Modeling and Design of an Anti-Vibration Control System," Department of Mechanical and Automation Engineering, National Kaochsiung First University of Science and Technology, Kaohsiung, Taiwan, (2015).

Kim et al., "Test and Simulation of an Active Vibration Control System for Helicopter Applications," Int'l J. of Aeronautical & Space Science, p. 444-445, (2016).

International Search Report and Written Opinion for Application No. PCT/US2019/012292 dated Mar. 28, 2019.

European Office Action for U.S. Appl. No. 19/702,146 dated Aug. 11, 2022.

European Office Action for Application No. 19702146 dated Nov. 30, 2023.

* cited by examiner

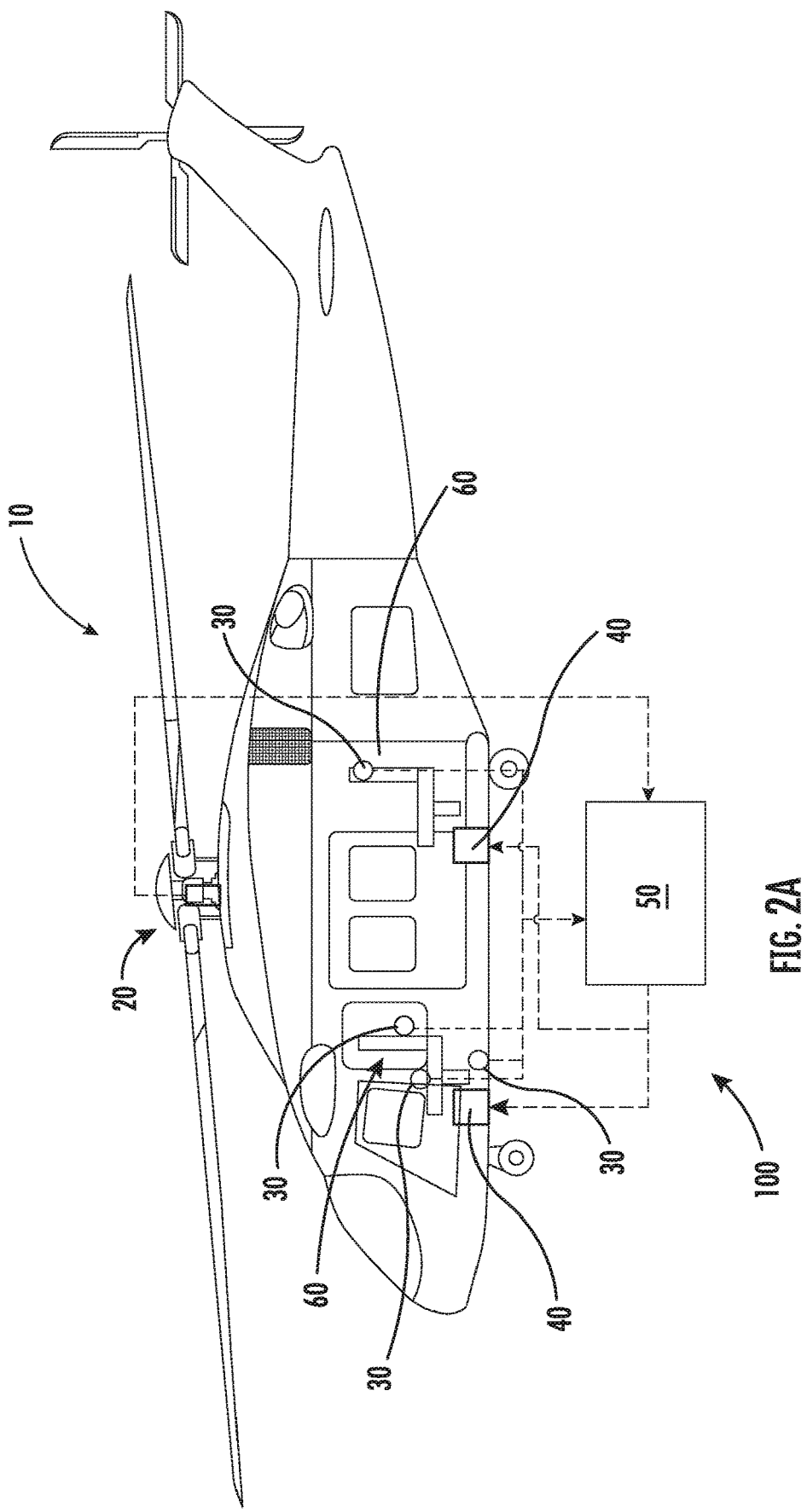

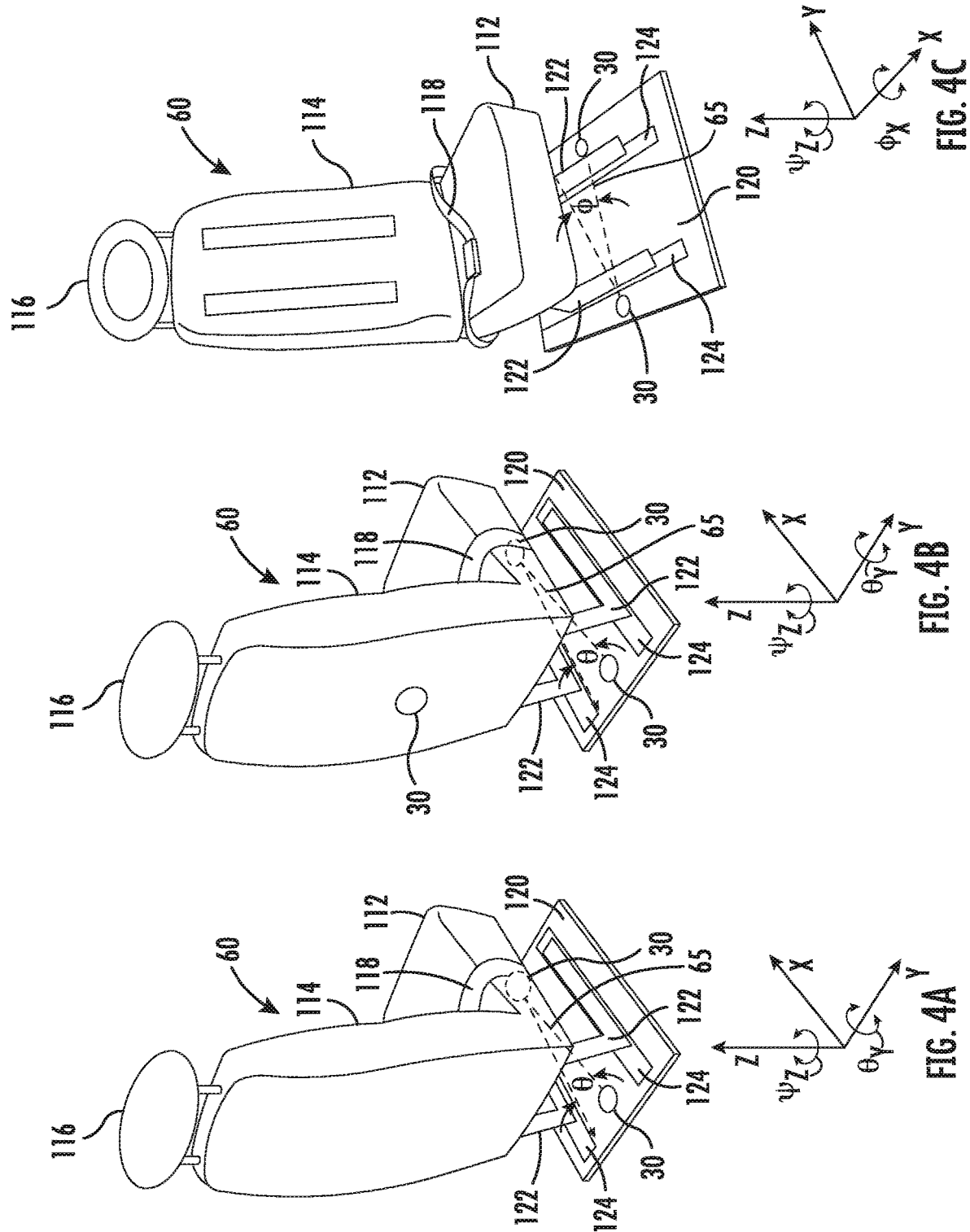

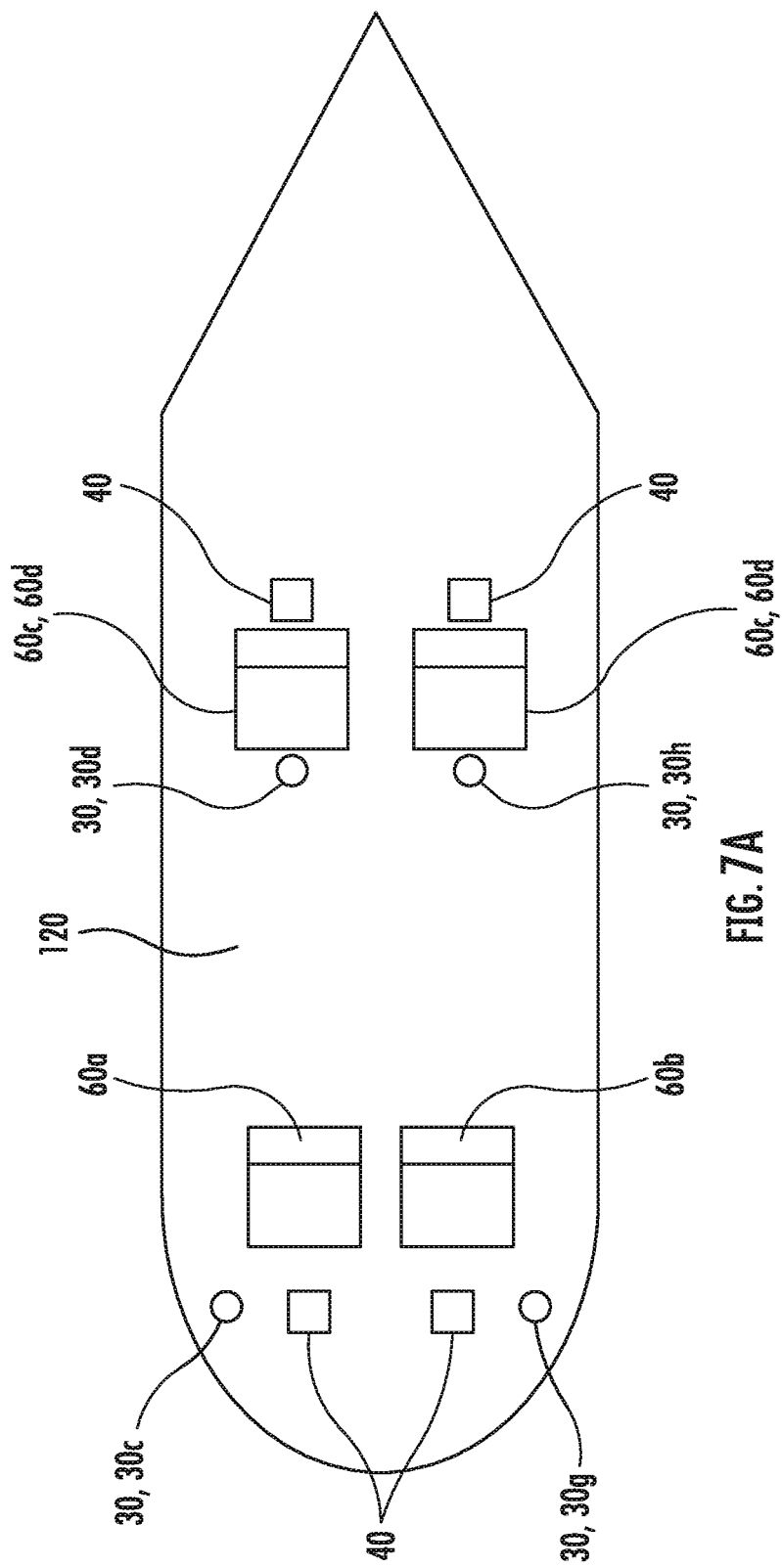

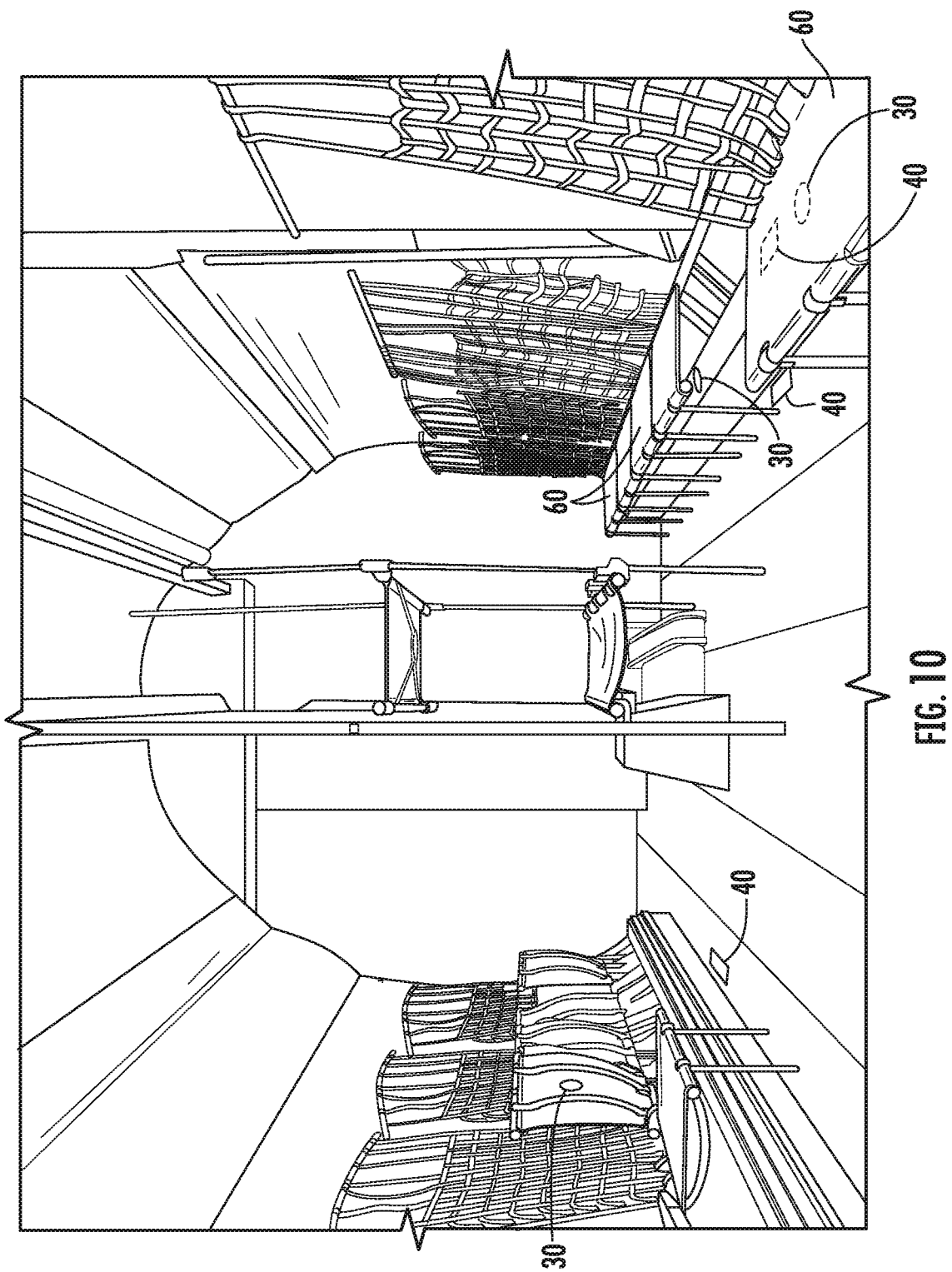

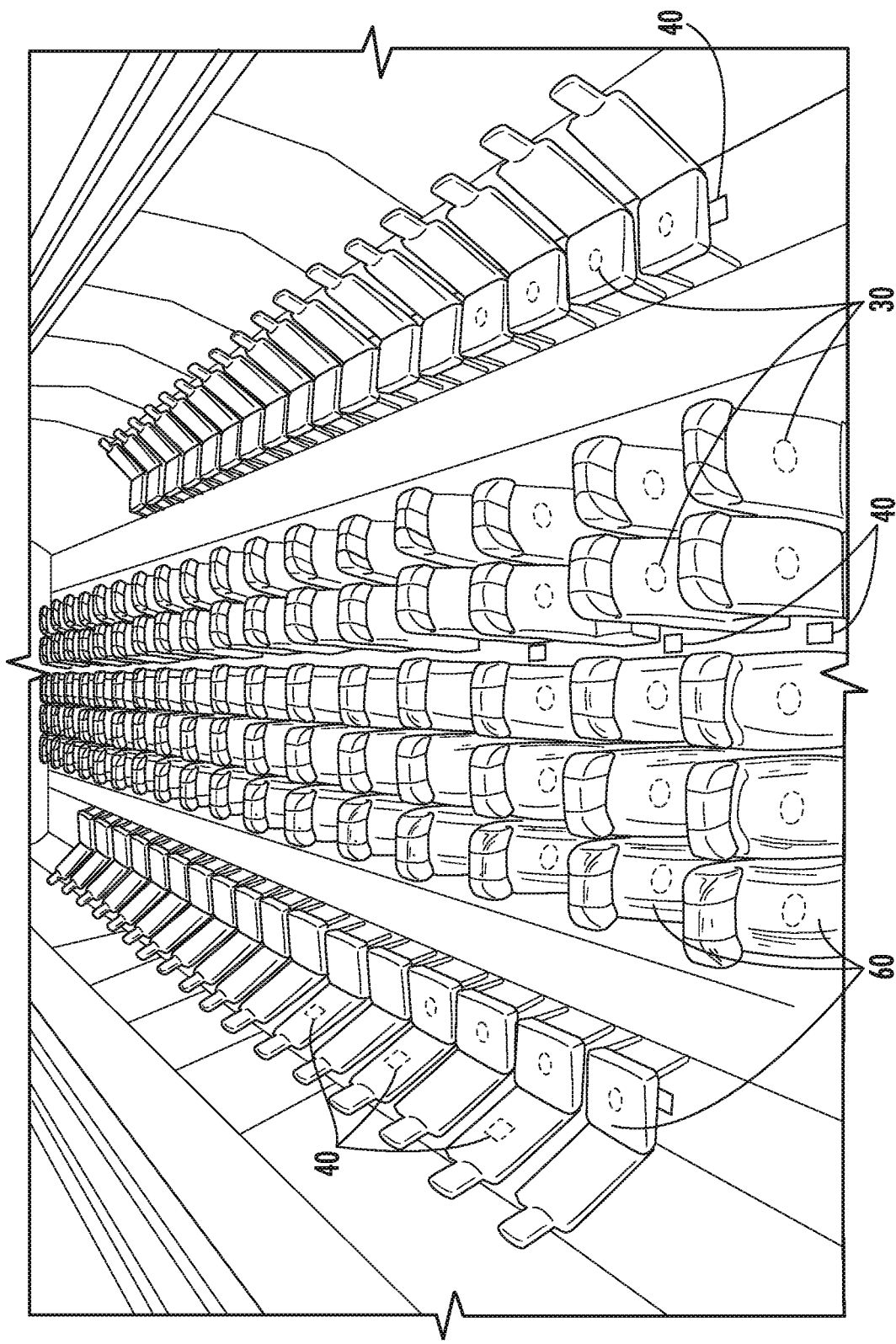

ACTIVE VIBRATION CONTROL OF FLOOR AND SEAT FRAME VIBRATION

CROSS-REFERENCE TO RELATED APPLICATIONS

The present application claims the benefit of U.S. Patent Application Ser. No. 62/664,314, which was filed on Apr. 30, 2018, the disclosure of which is incorporated herein by reference in its entirety.

TECHNICAL FIELD

The subject matter disclosed herein relates to the design and operation of vibration control systems to reduce seat vibration, especially high levels of seat vibration, and other structural and mechanical vibrations within an aircraft structure. The exemplary embodiments relate to reducing seat vibration on an aircraft, such as a helicopter or fixed wing aircraft.

BACKGROUND

In most aircraft, high seat vibration leads to premature exhaustion and fatigue for occupants of the aircraft such as pilots, co-pilots, passengers, gurney patients and the like. Active vibration control systems (AVCS) are currently unable to remove high levels of seat vibration experienced when the seat is not being directly controlled by the AVCS. Currently known AVCS solutions use force generators, either linear or circular force generators (LFGs or CFGs), disposed on the structure of the aircraft, as well as control sensors, that are also disposed on the structure of the aircraft to provide vibration reduction in the structure of the aircraft. While this approach to reducing structure vibration works for some aircraft applications, the seat vibrations still remain unacceptably high in helicopters and in many fixed wing aircraft.

Currently, seat vibration is amplified due to seat geometry, resonances, and/or loose attachment to the structure. What is lacking in the industry is the ability to reduce or substantially eliminate vibrations in the structure of the aircraft with respect to the seat, where vibrations remain high, or within the seat itself.

One problem when attempting to control the vibration of an aircraft seat frame is the degrees of variability encountered. Differences in the weight, center of mass, and movements of a seat occupant, whether a seat is occupied or unoccupied, whether at least two seats are mechanically coupled with at least one seat occupied and at least one seat unoccupied, the varying degrees of freedom for movement of the seat itself during flight, as well as seat designs that include adjustable parameters (e.g., seat height, fore/aft position, position relative to a track, fore/aft tilt angle, and lateral tilt angle) all introduce errors into existing AVCSs and their associated vibration control algorithms. In order to ensure acceptable levels of vibration control and attenuation (e.g., reduction), these seat and occupant variables must be known and accounted for, and then corrected.

SUMMARY

In one aspect, an active vibration control system (AVCS) for controlling motion and/or vibration of at least one seat attached to an aircraft structure is provided. The AVCS comprising at least one controller, one or more force generators, and one or more sensors. The one or more force generators are attached to the at least one seat and/or the structure, the one or more force generators are in electronic communication with the controller. The one or more sensors are in electronic communication with the controller. The one or more sensors are attached to the structure and/or to the at least one seat, wherein the one or more sensors are configured to measure motion and/or vibration and to communicate a sensor data corresponding to the motion and/or vibration to the controller. The controller is configured to receive the sensor data from the one or more of sensors, to calculate a cancelling force for each of the one or more force generators from the data received, and to electronically communicate a control signal to the one or more force generators. Each of the one or more force generators is configured to generate the cancelling force to reduce a motion and/or vibration of the seat and/or structure, the cancelling force based on the control signal.

In another aspect, an active vibration control system (AVCS) for controlling motion and/or vibration of a seat attached to a structure of an aircraft is provided. The AVCS comprising at least one controller, at least one force generator, and at least one sensor. The at least one force generator being attached to the seat and/or to the structure of the aircraft, the at least one force generator being in electronic communication with the controller. The one or more sensors are in electronic communication with the controller. The at least one sensor being attached to the seat and/or to the structure of the aircraft, the at least one sensor being in electronic communication with the controller, wherein the at least one sensor is configured to measure motion and/or vibration and to communicate a sensor data corresponding to the motion and/or vibration to the controller. The controller is configured to receive the sensor data from the at least one sensor, to calculate a cancelling force for each of the at least one force generator from the data received, and to electronically communicate a control signal to the at least one force generator. Each of the at least one force generator is configured to generate, based on the control signal, the cancelling force to reduce a motion and/or vibration of the seat and/or structure.

In still another aspect, a method for controlling motion and/or vibration of a seat attached to a structure of an aircraft. The method comprising the steps of sensing the motion and/or vibration of the seat, wherein the sensing is done with at least one sensor attached to the seat and/or to the structure of the aircraft; controlling using a controller the motion and/or vibration, wherein the controller is in electronic communication with the at least one sensor and is configured to receive data from the at least one sensor, calculate a vibration cancelling force, and communicate that vibration cancelling force phase and magnitude to one at least one force generator attached to the seat and/or to the structure of the aircraft; and reducing a motion and/or vibration of the seat by using the at least one at least one force generator to impart a cancelling force thereto.

Numerous objects and advantages of the inventive subject matter will become apparent as the following detailed description of the preferred embodiments is read in conjunction with the example drawings illustrating such embodiments.

BRIEF DESCRIPTION OF THE DRAWINGS

FIG. 2A is a schematic side view illustration of an example AVCS configured for vibration control of seats within an aircraft, with vibration sensors mounted to or proximate to one or more such seats.

FIGS. 4A-4C illustrate perspective view example placements of sensors on a structure close to a seat in order to control and/or reduce vibrations in the structure and/or the seat.

FIG. 7A illustrates a schematic plan view of the configuration of vibration sensors and force generators used for vibration control in the data plots of FIGS. 8A-8D and 9A-9D for the AVCS structure control. FIG. 7A is similar to the embodiment found in FIG. 1.

FIG. 7B is similar to the embodiment found in FIG. 2B.

FIGS. 10-13 are various views of seats in fixed wing and rotary wing aircraft.

DETAILED DESCRIPTION

FIGS. 1-13 illustrate various views, embodiments, and/or aspects associated with active vibration control systems (AVCS), as well as related methods by which vibration levels of a seat in an aircraft, such as an exemplary helicopter, can be significantly reduced. The following embodiments allow for the vibration levels to be reduced between about 10% to about 90%. The reduction in vibration is driven by the use. For example, a luxury seat may intentionally have substantially higher vibration reduction over that of a standard passenger seat. Similarly, a long-haul aircraft may require greater vibration reduction in the seats over that of a short-haul aircraft. And, a medevac gurney may require significant vibration reduction for the patient. Each embodiment and end-user requirement drives the desired vibration reduction.

Figure 11A:
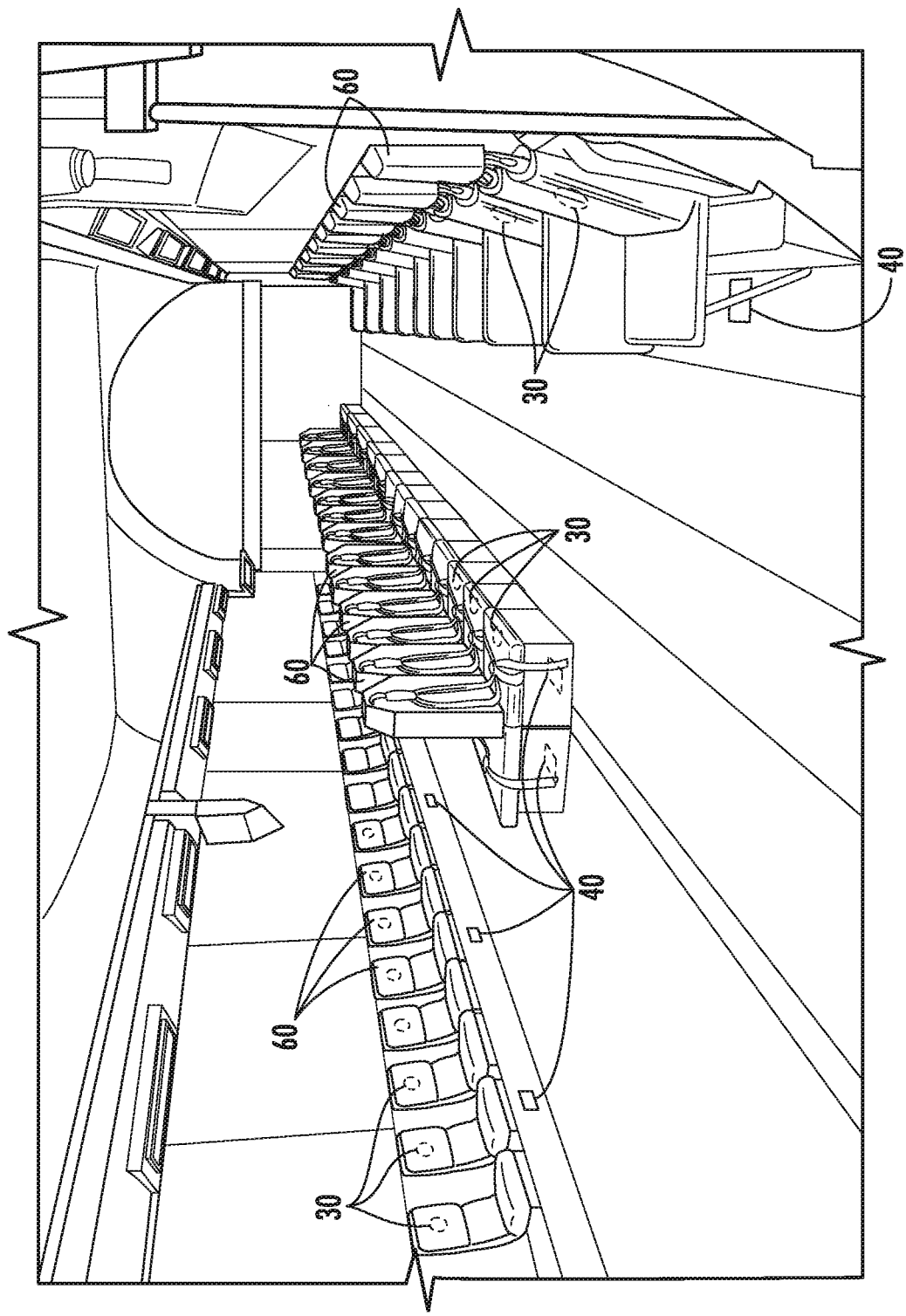
Figure 12A:
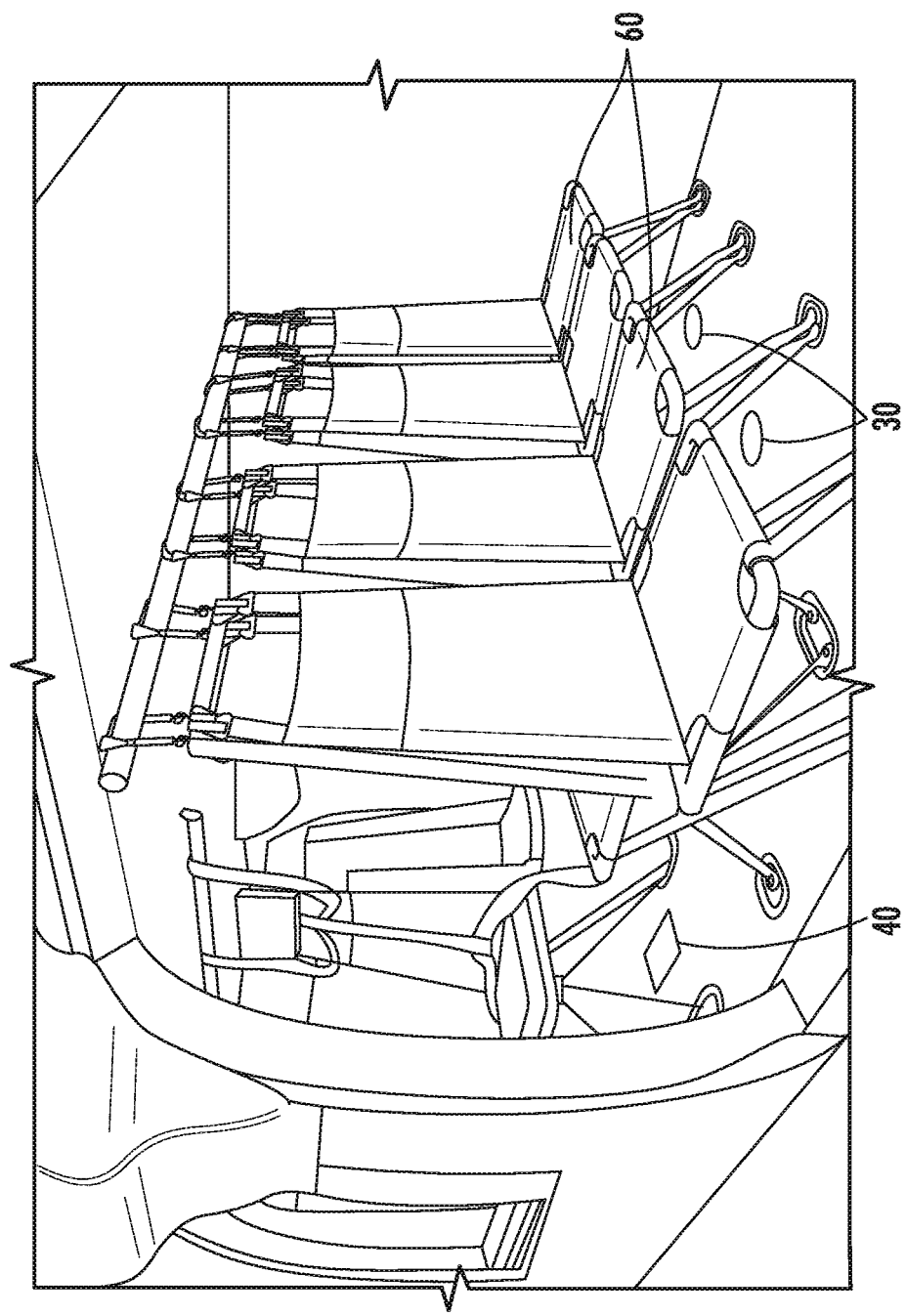
Figure 12B:
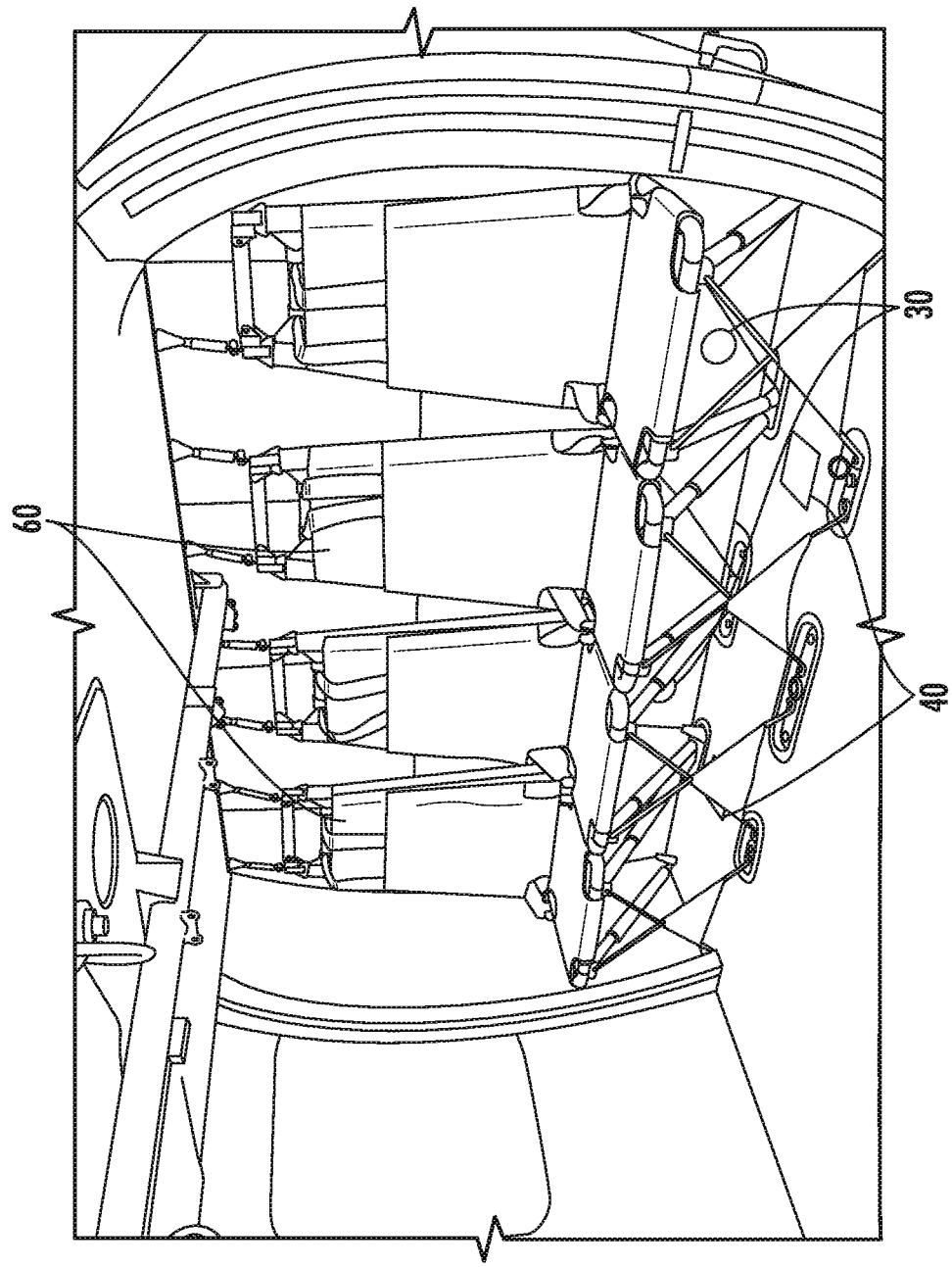

For the purposes of this disclosure, the aircraft used to illustrate the various embodiments will be a helicopter, which is used for solely for the purpose of illustration of the invention and is not meant to be limiting to the type of aircraft the invention may be employed within. Any seat experiencing vibrations may be substituted for the embodiments illustrated with a helicopter, to include fixed wing aircraft. For example, FIGS. 10, 11A and 11B illustrate embodiments used on fixed wing aircraft.

Figure 1:
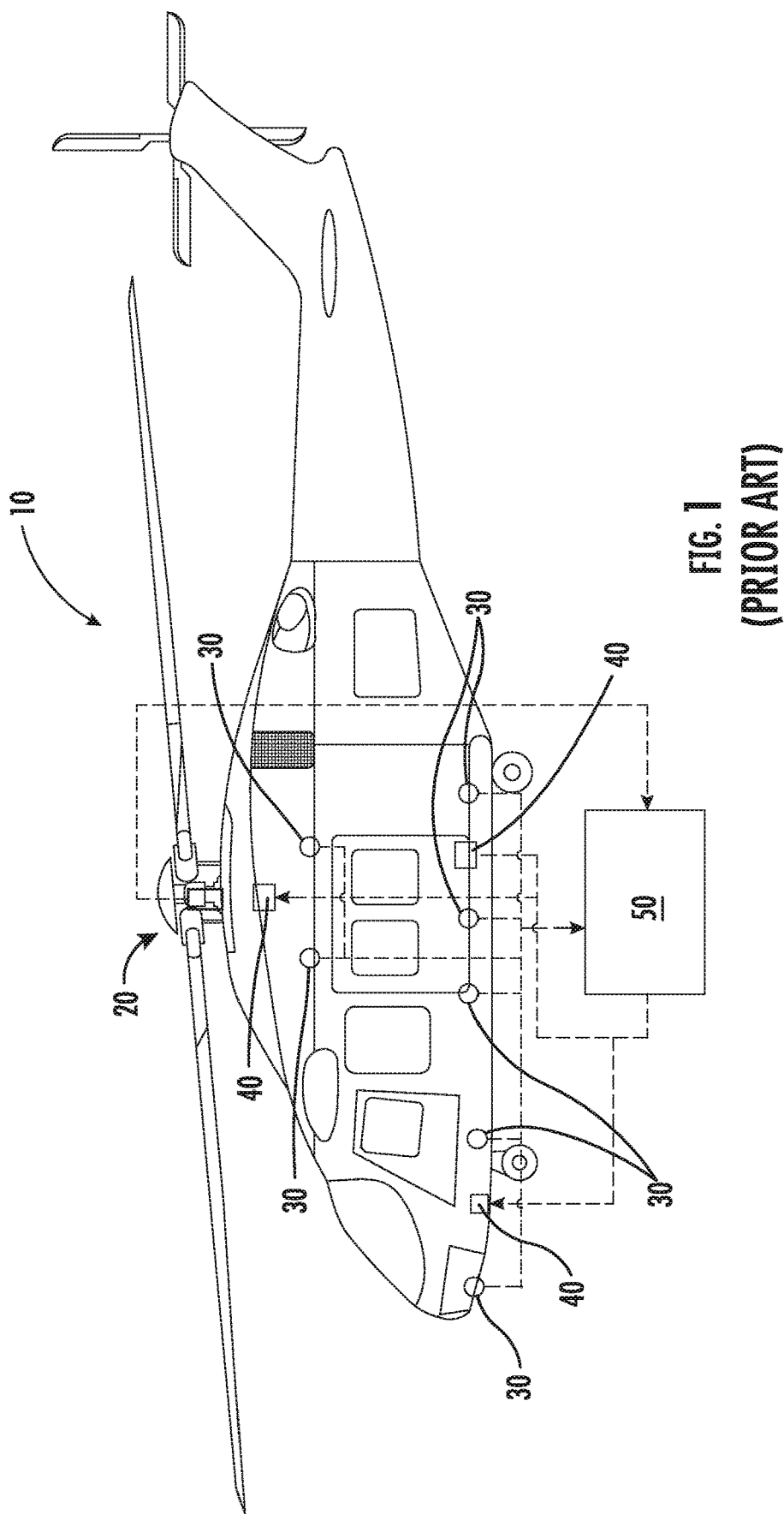
FIG. 1 is a schematic side view illustration of a prior art active vibration control system (AVCS) used to control helicopter structure vibration levels.

Referring to FIG. 1, a representative prior art AVCS system is illustrated in helicopter 10. The AVCS system of the prior art helicopter 10, as well as the embodiments described herein, include a plurality of vibration sensors 30, a plurality of force generators 40, and a controller 50. Additionally, the AVCS may also include additional informational input such as data from aircraft speed sensor 20 or flight performance data from the helicopter avionics (not shown). For FIG. 1, AVCS is directed to the structure of helicopter 10 and/or the rotor hub.

Figure 2B:
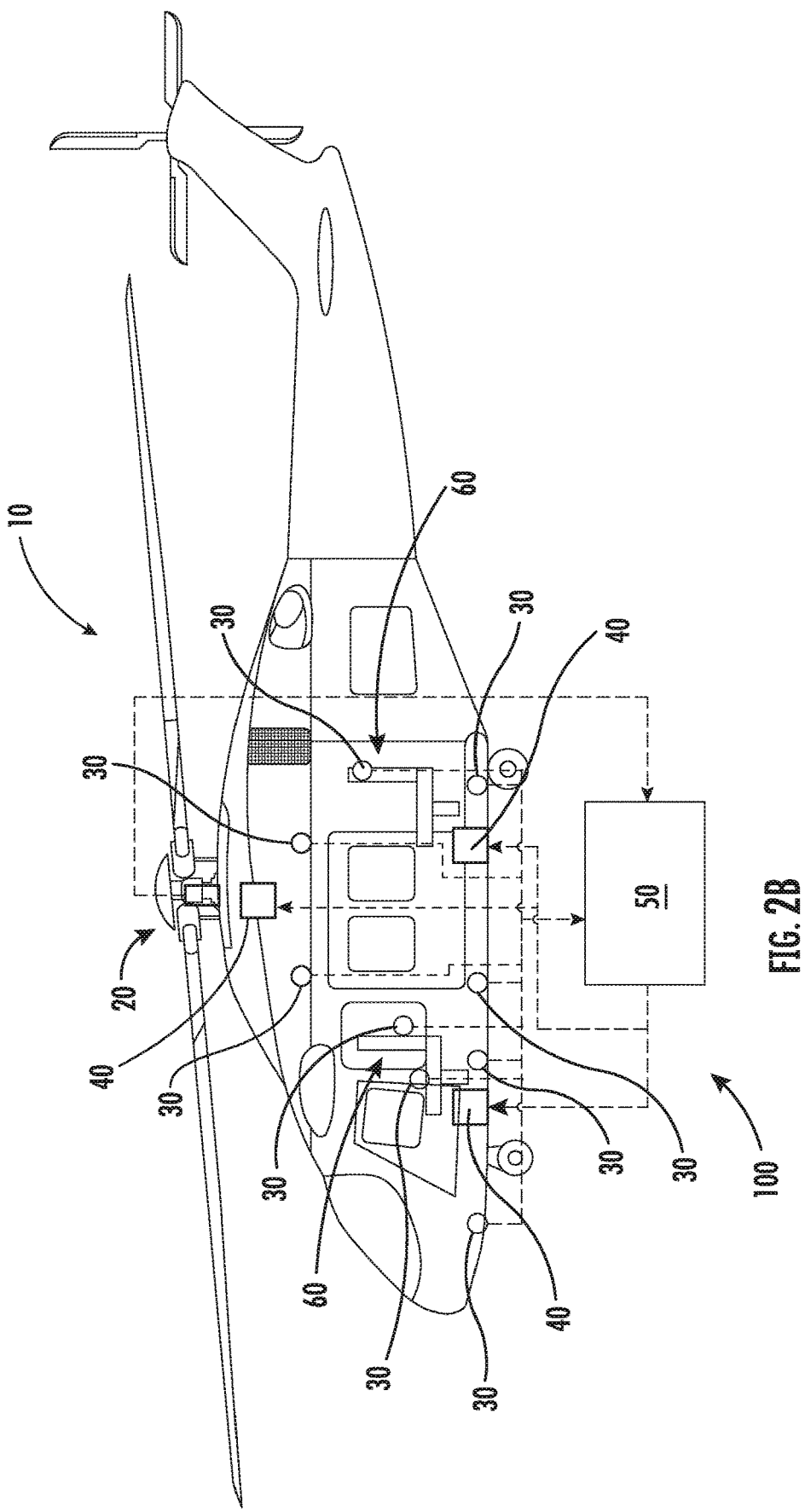
FIG. 2B is a schematic side view illustration of an example AVCS configured for vibration control of seats and structure within an aircraft, with vibration sensors mounted on or proximate to one or more such seats and to the structure.

Referring to FIGS. 2A and 2B, a helicopter 10, is illustrated having an AVCS 100. Similar to the prior art example of FIG. 1, AVCS 100 includes a plurality of vibration sensors 30, a plurality of force generators 40, controller 50, aircraft speed sensor 20, and if available, flight performance data from the avionics of helicopter 10. However, in the embodiment illustrated in FIGS. 2A and 2B, as well as FIGS. 3A-9D, AVCS 100 adds the vibration control of at least one seat 60, medevac gurney 70, and/or a structure attached to the helicopter (referred to hereinafter as "attached structure"), such as an equipment rack or service closet. Seat 60 is used to illustrate the embodiments, but a specific type of seat 60, a medevac gurney 70, and/or any attached structure may be substituted for seat 60 in each embodiment. All of which are described in detail within the inventive embodiments hereinafter.

In AVCS 100, the plurality of vibration sensors 30, and the plurality of force generators 40, are arranged at various points of the helicopter structure. All vibration sensors 30 and all force generators 40 are in electronic communication with controller 50. Each vibration sensor 30 is capable of detecting at least one vibration near the position of the individual vibration sensor 30. Each vibration sensor 30 is configured to provide an electronic vibration input (referred to hereinafter as "input signal") to controller 50 in one or more axes as discussed hereinbelow, such that controller 50 receives a vibration signature (e.g., frequencies and amplitudes of vibration) at each of the locations where vibration sensors 30 are installed. The input signal of vibration sensors 30 corresponds to the vibration signature present at the location of each vibration sensor 30. Controller 50 receives a signal from the aircraft speed sensor 20, to determine a rotary speed of the rotor. Controller 50 is configured to use the input signal of each vibration sensor 30 to calculate a cancelling force for one or more force generators 40 designated to control vibration at one or more vibration sensors 30. Controller 50 uses known algorithms to calculate the cancelling force a respective force generator 40 needs to generate to reduce or eliminate the vibration measured at a particular vibration sensor 30 having corresponding force generator 40 generating the cancelling force. This is typically done using a feed-forward algorithm or a predictive algorithm. However, other algorithms known to those having skill in the art will also work. After the input signal having the vibration signature of each vibration sensor 30 is analyzed by controller 50, a control signal or command signal corresponding to the cancelling force calculated is sent to the appropriate force generator 40 to reduce a vibration of the aircraft structure detected by the vibration sensor 30.

In some embodiments, controller 50 is configured to receive the rotational speed (e.g., rotor speed, rotor position) of the aircraft main rotor from speed sensor 20. In some embodiments, vibration is reduced and cancelling forces created at the rotational speed of the main aircraft rotor or an integer or non-integer multiple of the main aircraft rotor speed. For helicopters, active vibration control is typically performed at a frequency equal to the main rotor speed multiplied by the number of rotor blades. In some embodiments, controller 50 uses a predictive algorithm such as a feed-forward algorithm to calculate the cancelling force to be applied by force generators 40. In such embodiments, force generators 40 installed on structure 120 of helicopter 10 (e.g., bulkheads, flooring, etc.) will be used to generate a cancelling force for vibration reduction to control vibration detected by vibration sensors 30 that are attached to or proximate to such structure 120. In some other embodiments, controller 50 combines the motion and vibration data from all vibration sensors 30 and provides corrective input such as a cancelling force to the force generators 40 to reduce the motion and vibration detected at all vibration sensors 30

The structure 120 of an aircraft, such as helicopter 10, may be defined as the frame, floor, bulkheads, consoles, aircraft skin, and the like. As used herein, the floor is the predominate example to illustrate the invention. In many cases, the seat 60 vibration can be significantly amplified with respect to the vibration of the structure that the seat 60 is attached. This occurs for several reasons including the case where the seat 60 acts as a lever arm amplifying any rocking motion in the attaching structure. Additionally, some seat frames 110 can have one or more vibration modes near the vibration excitation frequency amplifying the vibration on the seat 60. Furthermore, the attachment points of the seat 60 are often loosely fitted at the structure 120 to allow adjustability of the seat 60. For these and other reasons, the seat 60 vibration can be significantly higher than what is seen on the structure 120, such as the floor, as result of only having the embodiment illustrated in FIG. 1.

Referring to FIGS. 2A-6C and 7B, a schematic illustration of the AVCS 100 with direct seat 60 vibration control is shown. As shown in FIG. 2A, a plurality of vibration sensors 30 are mounted to or proximate to at least one seat 60 that is to have vibration control implemented thereon. The invention described herein applies to a single seat 60, more than one seat 60, or different types of seats 60. Not every seat 60 on an aircraft needs to be configured to have vibration sensors 30 attached or proximate thereto. For example, a higher level of vibration reduction may be desired by a pilot and copilot than for the passengers where the passengers may not need a vibration sensor 30 attached to or proximate seat 60. Alternatively, an executive seat 60 may require more vibration control.

To illustrate the variability of seat 60, seat 60 may have many configurations and components thereby increasing the difficulty of cancelling vibrations. In the illustrated example, seat 60 has a seat frame 110, seat pad 112, and a seat back 114. Seat 60 may have a headrest 116, and if so, headrest 116 may be integrated with seat 60 or adjustably attached to seat 60. In an aircraft, almost all seats 60 include a seatbelt 118, which may be a lap belt, shoulder harness straps, or a lap belt and a shoulder harness. Seat 60 may be mounted on a seat rail 122 or it may be directly mounted to the structure 120. Some seats 60 are configured with hardware to allow it to be adjustable in the fore and aft direction, however, not every seat 60 will have this capability. Additionally, seat 60 often has a tilt adjustment, but not in every seat 60. Seat 60 may include armrest that are integrated with seat 60, or proximate to seat 60, and fixed or movable relative to seat 60. Seat 60 may be attached to or integrated with a console. Vibration sensors 30 may be affixed to, affixed in, or affixed proximate to one or more of seat 60 components.

As illustrated in FIGS. 2A and 2B, a forward seat 60, such as a pilot or co-pilot seat 60, has two vibration sensors 30 mounted thereon. In this configuration, at least one vibration sensor 30 is shown on the seat back 114 and at least one vibration sensor 30 is shown on the seat pad 112, while the rear seat 60 is shown having only a single vibration sensor 30 mounted on the seat back 114 portion. This arrangement allows for greater control capabilities such as more precise and/or accurate vibrations measurement for the front seat 60 than the rear seat 60. This arrangement can be repeated as desired for some or all other seats 60, and each seat 60 can have the same or a different number of vibration sensors 30 mounted thereon.

The AVCS of FIGS. 2A and 2B is shown as providing vibration control of seats 60, using vibration sensors 30 and force generators 40, with controller 50 being configured to provide vibration reduction to seats 60. The AVCS includes vibration sensors 30 and force generators 40, where vibration sensors 30 are mounted to seats 60 and/or structure 120 of helicopter 10, and force generators 40 mounted to helicopter 10, proximate to seats 60, as well as at other locations within helicopter 10 for vibration reduction at other points on the structure 120 of helicopter.

In the embodiments of FIGS. 2A and 2B, a variety of configurations for attaching a plurality of force generators 40 to provide vibration cancelling forces are illustrated. In the embodiments illustrated, attached to the structure 120 of helicopter 10 are a plurality of force generators 40, with at least one force generator 40 being attached to the structure 120 proximate to each seat 60 that is to have vibration control implemented thereon. In some embodiments, more than one force generator 40 can be mounted proximate to one or more seats 60 (e.g., fore and aft and/or port and starboard). In some other embodiments, one force generator 40 can be mounted proximate to one or more seats 60 in order to provide vibration reduction for more than one seat 60. In some embodiments, one or more force generator 40 can be attached to one or more of the seats 60, such that vibration reduction can be achieved by applying the cancelling force directly to seat 60 rather than to the structure 120 of the helicopter proximate to seat 60. In some such embodiments, one or more force generators 40 can be attached to one or more seats 60, as well as to the structure 120 of helicopter 10 proximate to the one or more seat 60, such that structure 120 vibration and seat 60 vibration can both be controlled directly.

Vibration sensors 30 may be any sensor capable of detecting and/or measuring motion, and are configured to communicate the motion detected and/or measured to controller 50. In some embodiments, vibration sensors 30 are accelerometers. Force generators 40 may be any suitable device configured to generate a suitable cancelling force, such as a linear force generator (LFG), a circular force generator (CFG), and/or an active isolator. As seen in FIG. 2A, vibration sensors 30, speed sensor 20, and force generators 40 are in wired electronic communication with controller 50. In some other embodiments, vibration sensors 30, speed sensor 20, and/or force generators 40 are configured for wireless communication with controller 50. In some such embodiments, less than all of vibration sensors 30, speed sensor 20, and/or force generators 40 are in wireless communication with controller 50, while other vibration sensors 30, speed sensor 20, and force generators 40 are in wired communication with controller 50. Any combination of vibration sensors 30, speed sensors 20, and/or force generators 40 may be in wired or wireless communication with controller 50.

In some other embodiments (not illustrated), two or more AVCS 100 are configured to operate independently of other AVCS system(s) in operation in the aircraft.

Figure 3A:
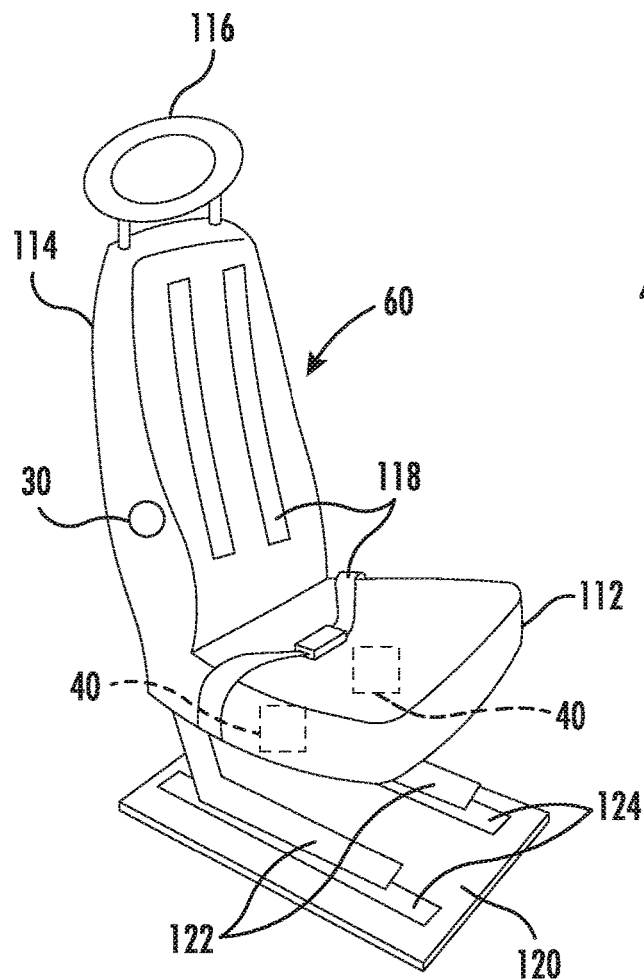
FIGS. 3A and 3B illustrate perspective view example placements of vibration sensors and force generators attached to an example seat of a vehicle, such as is used in an example helicopter.
Figure 3B:
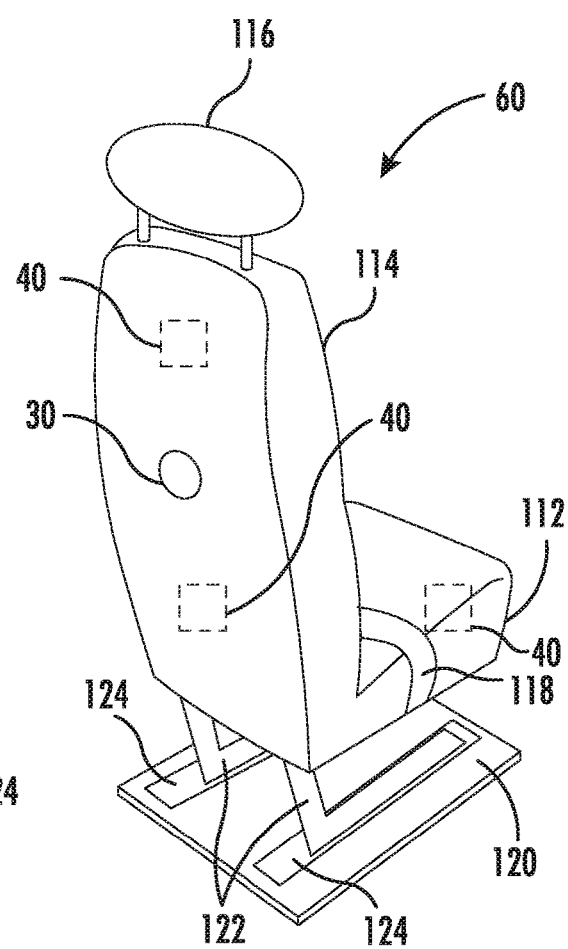

FIGS. 3A and 3B illustrate a typical seat 60 and various embodiments of attaching a vibration sensor 30 to the seat 60, as part of AVCS 100 illustrated in FIGS. 2A and 2B, having at least one vibration sensor 30 directly attached to the seat 60. In the embodiments of FIGS. 3A, and 3B, the seat 60 includes at least one seat frame 110 (not illustrated in FIGS. 3A and 3B). At least one seat rail 122, which is movable along at least one corresponding seat track 124, may also be included in the embodiment. Some seats 60 do not use a seat rail 122 and are directly attached to the structure 120 of the aircraft. As illustrated, seat rails 122 support a seat pad 112, on which an occupant of seat 60 sits. Seat pad 112 is also referred to herein as the seat bottom. Seat pad 112 is connected to seat back 114, against which the occupant rests his/her back while seated in seat 60. In the embodiments shown, an optional headrest 116 is located at a top of seat back 114, against which an occupant of seat 60 can rest his/her head during normal operation. The occupant is secured to seat 60 by a seatbelt 118, which includes shoulder harness straps and a lap belt in the embodiment shown. Any suitable type of seatbelt 118 may be used. As illustrated in FIGS. 3A and 3B, vibration sensor 30 is an accelerometer. In the embodiments of FIGS. 3A and 3B, the vibration sensor 30 described above may be any type of sensor configured to detect motion and/or vibration. In the embodiments of FIGS. 3A and 3B, where one or more vibration sensors 30 are directly attached to seat 60, enhanced vibration reduction is possible due to the vibration data for controller 50 (not illustrated FIGS. 3A and 3B) being obtained directly from vibration sensors 30 attached to the seat 60.

In the embodiment of FIGS. 3A and 3B, vibration sensor 30 is located on seat back 114. In some embodiments, vibration sensor 30 is contained on or within, either partially or entirely, any part of seat 60, such as seat pad 112, seat back 114, seat frame 110, headrest 116, seatbelt 118, seat rails 122, and/or seat tracks 124. In FIGS. 3A and 3B, force generators 40 are provided on or in seat 60. Although not illustrated in FIGS. 3A and 3B, force generators 40 may be adjacent to seat 60 in addition to or instead of on or in seat 60. In some embodiments, vibration reduction for seat 60 is achieved using force generators 40 located elsewhere within the aircraft, such as the force generators 40 not on or in seat 60, as illustrated in FIGS. 1-2B. As such, vibration sensor 30 is configured to detect the motion and vibration experienced by seat 60, and to provide such motion and vibration data to a controller for an AVCS 100 in an aircraft. In some embodiments, a vibration sensor 30 is attached to the structure 120 of the aircraft so as to simultaneously provide motion and vibration data at the structure 120 of the aircraft to the controller 50. The controller 50 combines such motion and vibration data from all vibration sensors 30 on and adjacent to seat 60, as well as on other structures within the aircraft, and provides a control signal to the force generators 40 to generate a cancelling force to reduce the motion and vibration at vibration sensor 30.

By mounting at least one vibration sensor 30 directly to, on or within, either partially or entirely, any part of seat 60, the data from vibration sensor 30 is such that the controller 50 is able to directly control motion and vibration of the seat 60. This additional data provides the controller 50 with location-specific data that improves the reduction in motion and vibration. By further adding at least one force generator 40 to the seat 60, such as is illustrated in FIGS. 3A and 3B, motion and vibration control of seat 60 may be controlled independent of other structures in the aircraft. In the embodiment of FIG. 3A, at least one vibration sensor 30 is attached to a lateral surface of seat back 114, either external to or within seat back 114. In the embodiment shown in FIG. 3A, a force generator 40 is preferably provided proximate to seat 60 and specifically in this embodiment on the side and bottom of seat pad 112. In the embodiment of FIG. 3B, at least one vibration sensor 30 is attached to a rear surface of seat back 114. In the embodiment shown in FIG. 3B, a force generator 40 is preferably provided on or proximate to seat frame 110 (not illustrated in FIG. 3B). Alternatively, or in addition to, force generator 40 is attached to seat pad 112 and/or to seat back 114. In some embodiments, force generator 40 is rigidly attached to a rigid portion of seat frame 110 (not shown in FIG. 3B), so that any padding present will not act to reduce the cancelling force generated by force generator 40. In some other embodiments, vibration sensor 30 and force generator 40 can be attached to headrest 116. In some other embodiments, vibration sensor 30 and force generator 40 can be attached to seat rail 122. In the embodiments of FIGS. 3A and 3B, the output of vibration sensor 30 can be sent to a controller 50 of an AVCS 100 for vibration control of a portion of an aircraft or to a separate controller 50 that is dedicated to vibration control of one or more seats 60.

Referring to FIGS. 4A-4C, alternative embodiments for placement of vibration sensor 30 are illustrated, with the at least one vibration sensor 30 being affixed to structure 120 of the helicopter at a position proximate to the seat 60 (e.g., in front of, behind, and/or beside seat 60 by no more than a maximum dimension of seat pad 112). In the embodiment shown in FIG. 4A, the controller 50 indirectly estimates the motion and vibration of seat 60 from the data transmitted to such controller 50 from at least one vibration sensor 30 on the structure 120. In some such embodiments, the vibration sensors 30 that are attached to structure 120, proximate to seat 60 can be used to estimate seat 60 vibration levels. In these embodiments, one advantage presented is that it is possible to directly control the seat 60 similarly to directly mounting vibration sensors 30 directly to seat 60 and/or seat frame 110 (not shown in FIGS. 4A-C), but avoiding the issues of variable loading, motion, and position that need to be adequately defined for such direct attachment applications.

As illustrated in FIG. 4A, at least one vibration sensor 30 is positioned on the structure 120 of the helicopter 10 proximate the front edge of seat 60 and at least one vibration sensor 30 is positioned on structure 120 of the helicopter proximate the rear edge of seat 60. Using the difference of the data from vibration sensors 30 positioned on structure 120 of the helicopter 10 to be proximate to both the fore and aft edges of seat 60 along with the distances between the vibration sensors 30 and various points on the seat, the controller 50 is configured to estimate the motion and vibration of seat 60 at one or more specified points on seat 60.

In yet another embodiment illustrated in FIG. 4B, vibration sensors 30 are affixed to both seat 60 and on structure 120 of the helicopter 10, proximate the seat 60. In this embodiment the vibrations sensors 30 that are positioned on the structure 120 of the helicopter 10 are arranged proximate the fore and aft edges of seat 60. The motion and vibration data from each vibration sensor 30, whether attached to structure 120 or seat 60, allows the controller 50 to calculate corrective force input to force generators 40 and control motion and vibration of the structure 120 and/or seat 60, depending on system behavior parameters.

One motion of seat 60 that can be detected is a rocking motion of seat 60. This rocking motion is defined as movement where the seat 60 moves in an oscillatory manner in the fore and aft directions, with the motion and vibration associated with this rocking motion increasing along the height of seat 60. When a rocking motion exists, the motion and vibration is greater at the top of seat back 114 than at the bottom of seat back 114. Another motion of seat 60 that can be detected is a swaying motion of seat 60. This swaying motion is defined as movement where the seat 60 moves in an oscillatory manner in the port (left) and starboard (right) directions, with the motion and vibration associated with this swaying motion increasing along the height of seat 60. When a swaying motion exists the motion and vibration is also greater at the top of seat back 114 than at the bottom of seat back 114.

As illustrated in FIG. 4C, at least one vibration sensor 30 is positioned on the structure 120 of the helicopter 10 proximate the right lateral seat rail 122 of seat 60, where it attaches to the helicopter structure, and at least one vibration sensor 30 is positioned on structure 120 of the helicopter 10 proximate the left lateral seat rail 122 of seat 60, where it attaches to the helicopter structure. Using the difference of the data from the sensors positioned on the structure 120 of the helicopter 10 and proximate of the seat 60, the controller is configured to estimate the swaying motion and vibration of the seat 60 at a desired point on the seat 60. The controller 50 will then directly control the vibration of the estimated swaying motion to reduce the seat 60 vibration.

Still referring to FIGS. 4A-4C, a coordinate axis is also illustrated. The z-axis is aligned with seat back 114, the x-axis is aligned with seat pad 112 in the fore/aft direction, and the y-axis is aligned with the seat pad 112 perpendicular to the fore/aft direction. In FIG. 4A, a motion $\psi_z$ (yaw) about the z-axis and a motion $\theta_y$ (pitch) about the y-axis are illustrated. Motion $\psi_z$ occurs when seat 60 twists in the x-y plane between vibration sensors 30 positioned fore and aft. Assuming the structure is rigid, Motion $\psi_z$ can be estimated using the difference of vibration sensors 30 measurements in the y-axis divided by the distance between the vibration sensors 30. Motion $\theta_y$ occurs when seat 60 twists in the x-z plane between vibration sensors 30 positioned fore and aft. Assuming the structure is rigid, motion $\theta_y$ can be estimated using the difference of vibration sensors 30 measurements in the z-axis divided by the distance between the vibration sensors 30. Vibration on the seat in the X and Z directions can then be estimated from the motion angles $\psi_z$ or $\theta_y$ in combination with the distances from the sensors on the floor to the desired location on the seat. For a more general situation where the structure and/or seat may not be rigid, dynamic transfer functions can be measured between vibration sensors 30 on the floor and the seat and these transfer functions can be used to estimate seat vibration from the floor vibration. In FIG. 4B, both motion $\psi_z$ about the z-axis motion $\theta_y$ about the y-axis are illustrated again. In this situation, the vibration sensor 30 on the seat back 114 can be used in conjunction with estimated seat vibration from the floor sensors to control vibration on the seat.

Measurement axes of the sensors 30, such as accelerometers, can be uniaxial (1-axis), biaxial (2-axes), or triaxial (3-axes), and then orient the axes. The uniaxial can be oriented with the x, y, or z axes. The biaxial sensors 30 can be oriented with x-y, x-z, or y-z axes. The triaxial sensors 30 can be oriented with all three axes, the xyz axes.

Assuming seat 60 is not as rigid as one desires, the upper portion of seat back 114 has some capability for additional motion. As illustrated in FIG. 4B, the fore-aft motion at sensor 30 on seat pad 112 is much higher than motion on the floor due to a large lever arm motion, but the angle is not always greater on the seat back 114 than the floor. The motion at sensor 30 on the seat pad 112 can be estimated from the z-axis distance from floor to sensor 30 as well as $\theta_y$. For estimating seat motion/vibration for $\theta_y$ and $\psi_z$ as illustrated in FIGS. 4B and 4C, a sensor 30 configured to measure motion/vibration in the z axis is required.

In FIG. 4C, the same motion $\psi_{z1}$ about the z-axis is illustrated along with a motion $\varphi_x$ (roll) about the x-axis. For estimating seat motion/vibration for $\psi_z$ as illustrated in FIG. 4B, a sensor 30 configured to measure motion/vibration in the x-axis is required. As in FIGS. 4A and 4B, in FIG. 4C motion $\psi_{z1}$ occurs when seat 60 twists in the x-y plane between vibration sensors 30 positioned fore and aft. Motion $\varphi_x$ occurs when seat 60 twists in the y-z plane between vibration sensors 30 positioned on the sides of seat 60. Motions $\psi_z$, $\theta_y$, and $\varphi_x$ are measured by vibration sensors 30 as vibrations and force generators 40 provide corrective cancelling forces as described herein. Combining the vibration sensors 30 illustrated in FIGS. 4A and 4B, provides for estimating all swaying angles (raw, roll, pitch) on the seat 60. Additional motions can be measured using motion sensors (not shown) and the data from the motion sensors can also be used by controller 50 to calculate the vibration cancelling force for force generators 40.

Figure 5:
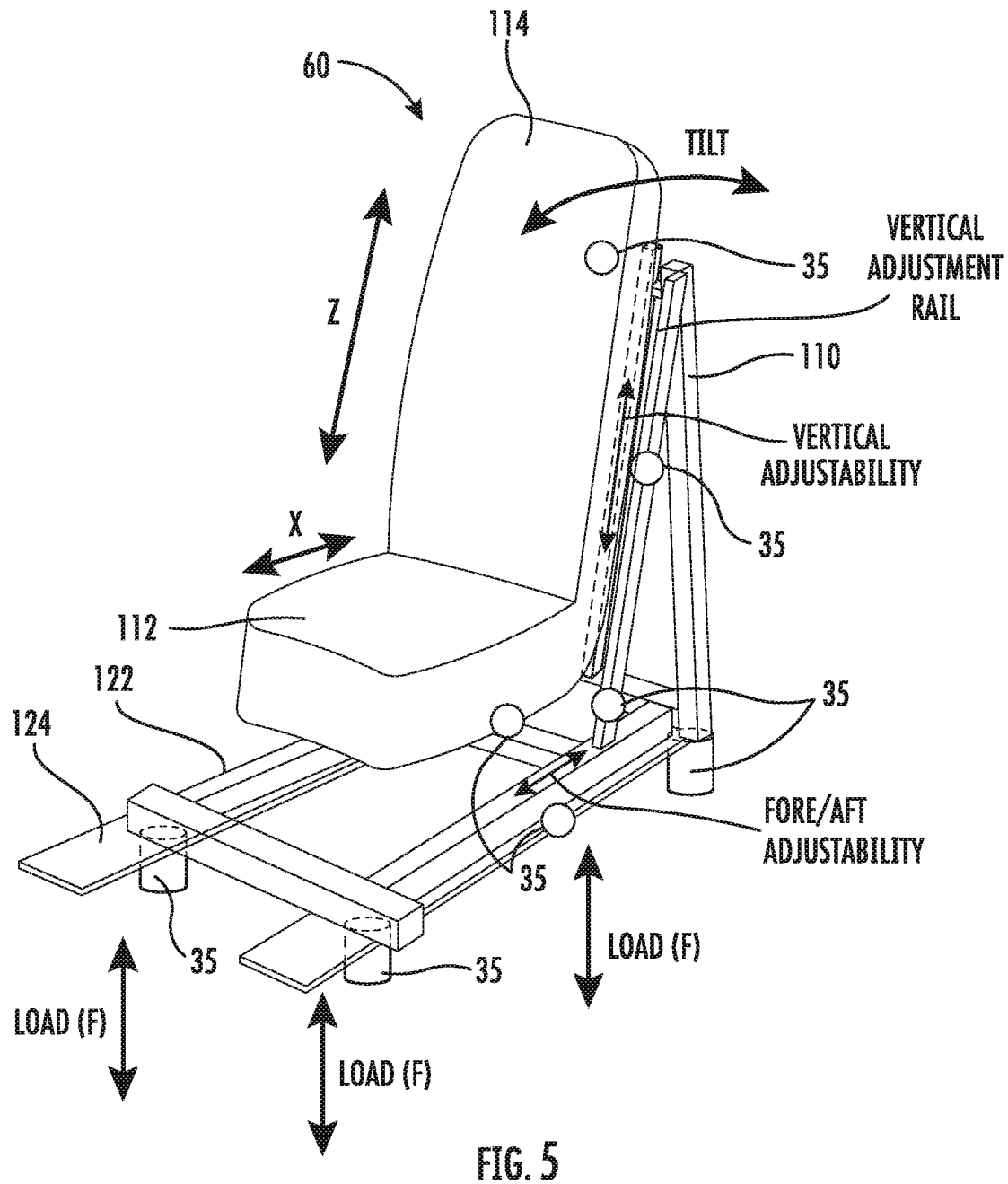
FIG. 5 illustrates a perspective view of potential degrees of freedom in movement of a seat, which must be accounted for by the AVCS to provide sufficient vibration control in the seat.

Referring now to FIG. 5, seat 60 and seat frame 110 are shown, with example degrees of freedom for adjustability of seat 60 during normal operation. While other degrees of freedom may be possible, three degrees of freedom are illustrated, the general directions of these degrees of freedom being noted by the double-ended arrows. The first degree of freedom is defined as a fore-aft seat adjustment (X). The second degree of freedom is defined as the vertical seat adjustment (Z). The third degree of freedom is defined as a recline adjustment (Tilt). Another factor affecting the dynamic response of the seat is the passenger load adjustment. Although three degrees of freedom and one additional impact on the dynamic response of the seat are identified, those skilled in the art understand that each possible degree of freedom and other dynamic response factors may be addressed and have vibration sensors 30 associated therewith.

Continuing to refer to FIG. 5, the controller 50 (not illustrated in FIG. 5) is configured for sensing position and load conditions of the seat 60 to automatically account for the seat 60 variability. In this embodiment, sensors 35 are additional position and/or load sensors which are mounted to seat 60 or seat frame 110 to determine the position and/or loading of seat frame 110. Sensors 35 have the same communication connectivity with controller 50 as vibration sensors 30, but sensors 35 are capable of measuring the position and load of seat 60. In one example of such embodiments, a linear displacement sensor 35 is used to measure the fore-aft and vertical sliding position of seat frame 110 and a linear or rotary sensor is used to measure the angle of seat back 114 relative to seat pad 112. In another example, one or more load sensors 35 are placed below the seat supports to determine the weight and location of a passenger. Various types of sensors 35 can be used of the purposes suggested above (e.g., linear variable displacement transformers, rotary variable displacement transformers, encoders, strain gauges, piezo patches, or load cells).

In an embodiment, controller 50 is configured to receive sensor 35 signals and determine the position and/or loading, of the seat frame 110 to automatically account for variability of the position and loading of the seat frame 110. An analysis of the seat 60 is performed prior to aircraft fielding, which determines the variability in seat 60 position to the dynamic response models used by the vibration control algorithm. Controller 50 is then configured to switch between dynamic models based on the sensed position or loading of the seat. During operation, the vibration control algorithm uses the modified seat 60 configuration dynamic model, which properly accounts for the variation in seat 60 position, to generate the vibration cancelling forces to be transmitted to the force generator(s) 40. The adjustment of the dynamic model can be done in a discrete manner or interpolation between models can be used for enhanced accuracy. Additionally, sensor weighting, actuator weighting, and convergence rate can be automatically adjusted based on seat position and/or loading for optimal control results.

In still other embodiments, controller 50 is configured to store preferences for each occupant, such as the amount of vibration reduction desired, the mass of the occupant, desired seat position, and the like, as selectable preset values to account for the seat 60 variability. In such embodiments, the typical seat occupant would define a pre-determined number of seat 60 configurations. These seat 60 configurations would all be modeled using a calibration procedure and stored in controller 50. This calibration procedure uses force generators 40 to stimulate seat 60 and/or seat frame 110 with vibration to measure the dynamic response of the seat configuration, and then stores the seat configuration model in a memory within the controller 50. This embodiment can be used with or without seat position and load sensors 35. The seat occupant would then use a user input device (not illustrated) to communicate the selected preset seat 60 configuration to controller 50 for the current flight. Controller 50 is configured to use the corresponding dynamic response model, sensor weighting, actuator weighting, and convergence rate information for determining the output forces for the vibration cancelling algorithm.

In some embodiments, when a seat 60 is adjusted beyond a pre-defined tolerance, a seat occupant, such as a pilot, copilot, crewmember, or passenger, would initiate a calibration procedure, similar to the calibration described above, using a switch in communication with controller 50. The defined tolerances would be determined prior to aircraft fielding and would correspond to acceptable stability margins. For example, a modification of seat 60 position from a nominal configuration changing the phase of seat 60 response by more than 90° can mandate a recalibration. In some embodiments, seat 60 position and loading tolerances would be defined in a maintenance procedure or manual. In this embodiment, a switch is used to initiate the recalibration procedure, but any suitable type of user input device may be used. For example, maintenance software, electrical button, keypad, and the like, could be used as the input device.

In still other embodiments, helicopter operational conditions are monitored to automatically account for the variability induced in seat 60 due to such helicopter operational conditions. In such embodiments, controller 50 is in electronic communication with the helicopter data controller, which provides periodic airspeed data as a further input for the vibration control algorithm. An analysis of the seat 60 is performed prior to aircraft fielding, which determines the changes in control action needed to maintain optimum vibration reduction performance during changes in aircraft airspeed. During operation, the vibration control algorithm modifies the control system parameters, such as sensor weighting, actuator weighting, convergence rate, and/or dynamic response model, used to determine the force cancellation commands based on the received airspeed. In this embodiment, while airspeed data may be used, other types of aircraft data may be used, such as altitude, orientation, gross weight, and/or vibration, either in addition to or in place of airspeed data. In this embodiment, an electronic data interface with the aircraft data computer is used, but other types of sensors or data interfaces may be used (e.g., airspeed sensor).

Figure 6A:
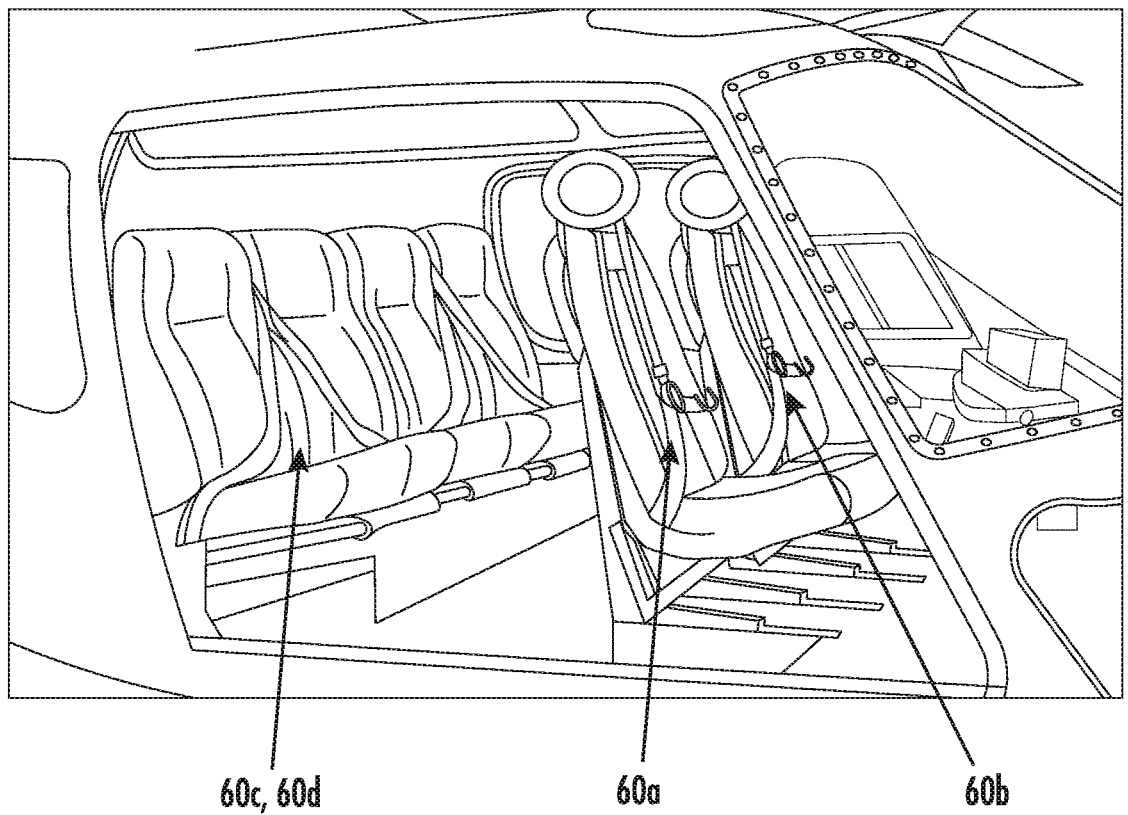
FIGS. 6A-6C illustrate perspective view example embodiments of several seat types in which vibration can be controlled using an AVCS according to the AVCS embodiments shown in FIGS. 2-3B.
Figure 6B:
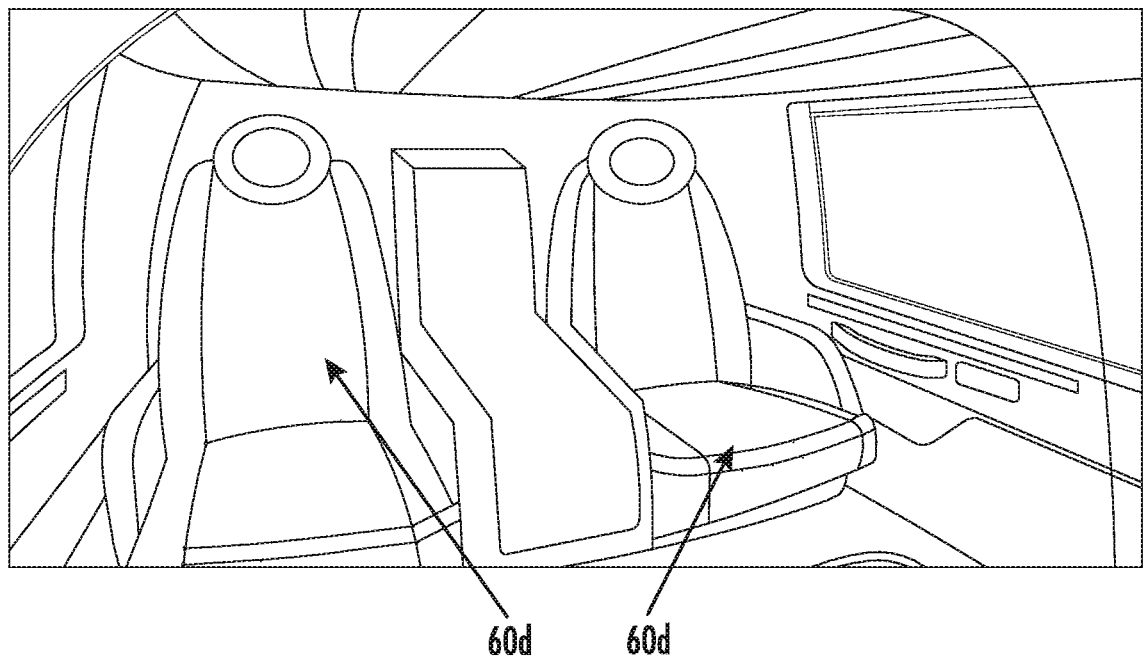
Figure 6C:
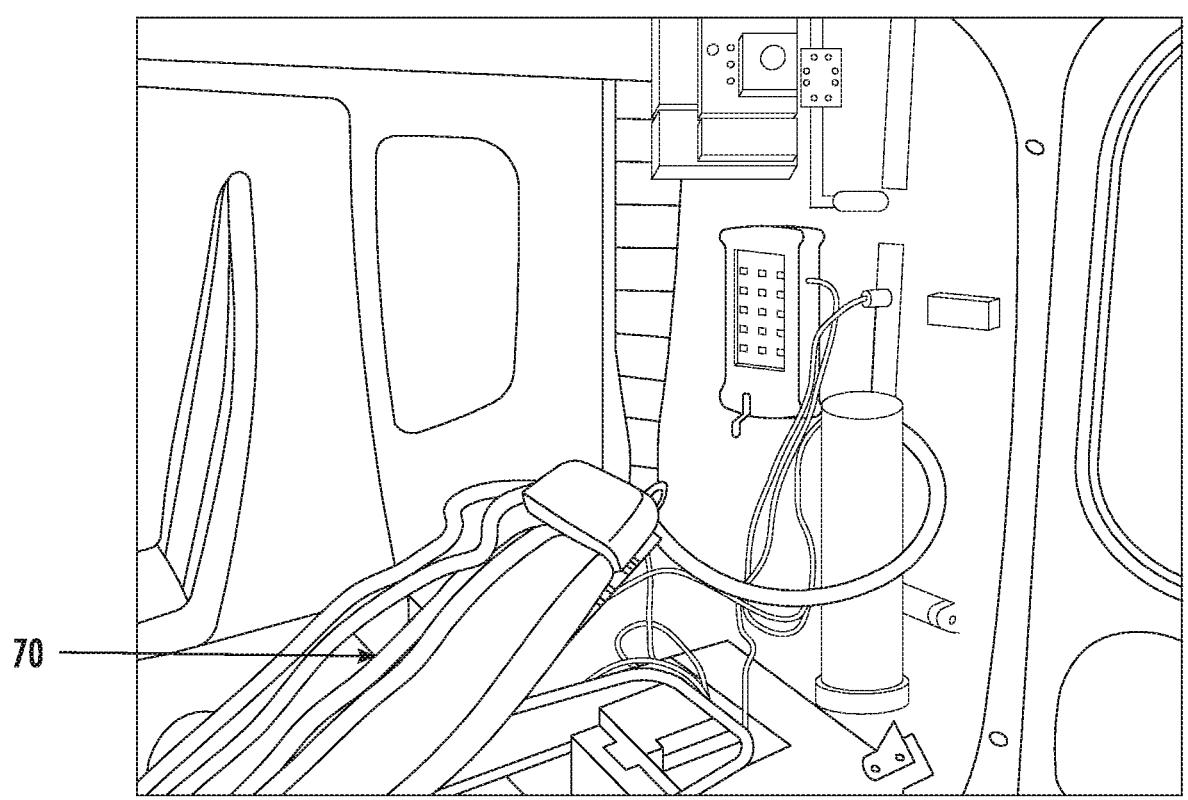

Referring now to FIGS. 6A-6C, various example applications for vibration reduction in seat 60 of an aircraft are shown. FIG. 6A illustrates an exemplary pilot seat 60*a*, copilot seat 60*b*, and passenger seats 60*c*. Using these seats in the various embodiments, the degrees of freedom of movement, the occupant mass, the masses of each type of seat 60, and the positions of the seats 60 may all be different, depending on any particular application in any particular aircraft or structure. FIG. 6B shows a plurality of luxury seats 60*d*, which may be configured to provide almost complete vibration reduction (e.g., greater than 90%) for certain occupant class types, such as a corporate executive. FIG. 6C shows a medevac gurney 70, such as is used in search and rescue or medical applications, which also requires significant vibration reduction for the administration of medical care during transport.

Figure 7B:
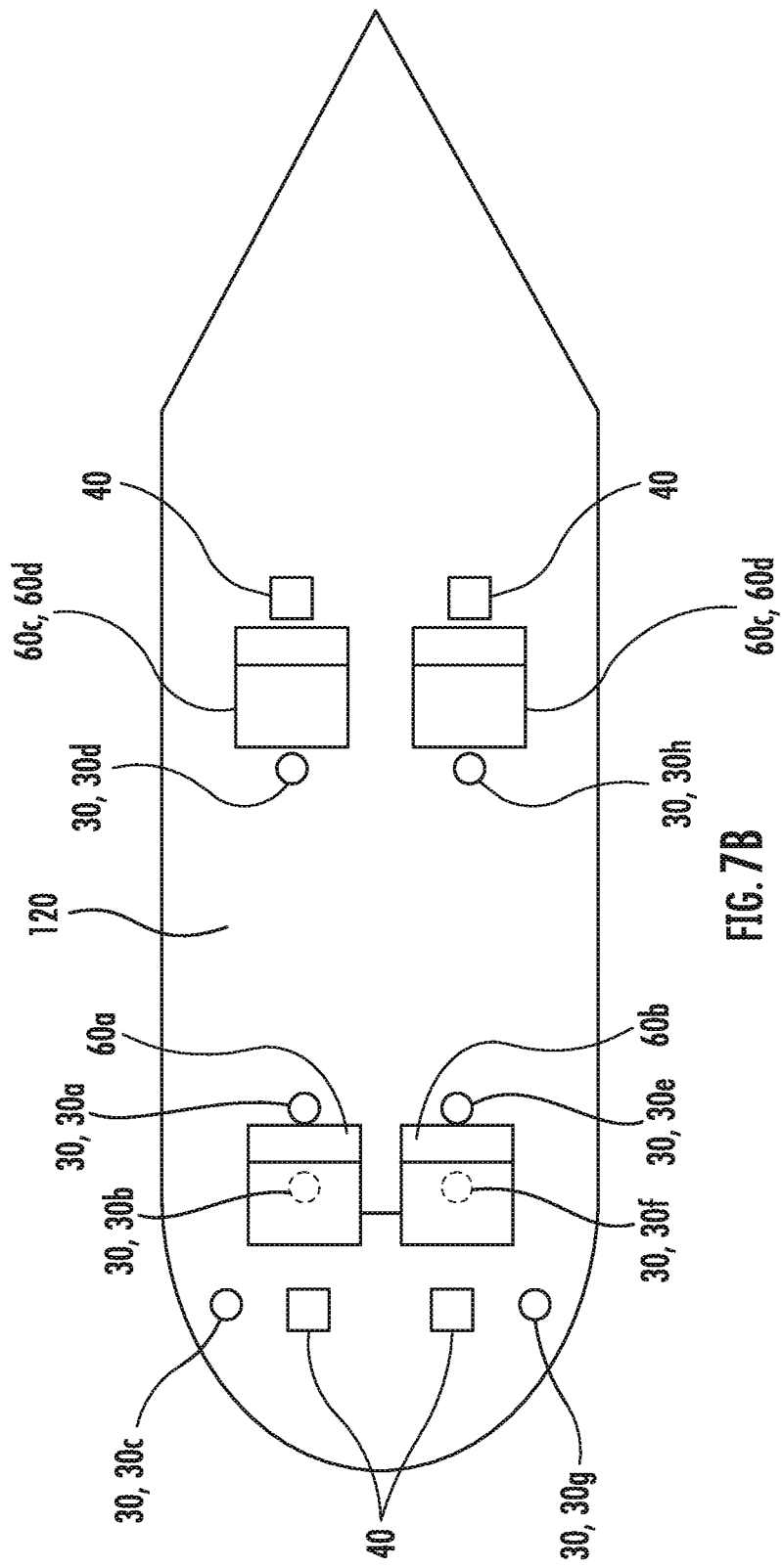
FIG. 7B illustrates a schematic plan view of the configuration of vibration sensors and force generators used for vibration control in the data plots of FIGS. 8A-8D and 9A-9D for the combined AVCS structure and seat control.

Referring now to FIGS. 7A-9D, in-flight vibration control results for a helicopter configured similar to the illustration of FIGS. 7A and 7B are shown graphically as data plots. These figures are bar plots of normalized vibration levels at a single airspeed value with: (i) no AVCS engaged (i.e., AVCS off—that is no AVCS is being used to control vibrations on the seat)—as illustrated in FIG. 7A; (ii) the AVCS engaged but without seat 60 vibration sensors 30 and force generators 40 directed to those vibration sensors 30 (i.e., AVCS On, referred to as "Structure Control")—as illustrated in FIG. 7A; and (iii) with an AVCS engaged as illustrated in FIGS. 2B and 7B (combined seat and structure control, referred to as "Combined Control). Since vibration is plotted as a normalized value, no units are used in any of FIGS. 8A-9D. The force generators 40 illustrated in FIGS. 7A and 7B were used to generate the graphical plots shown in FIGS. 8A-9D. The force generators 40 were located underneath the floor of the helicopter and proximate to the pilot and copilot seat 60*a*, 60*b* locations. Additionally, the force generators 40 were positioned proximate to passenger seats 60*c*, 60*d*. For the data obtained using the AVCS illustrated in FIGS. 7A and 7B, vibration sensors 30 used for AVCS control were located on the floor of the helicopter at locations illustrated in FIGS. 7A and 7B by vibration sensors 30*c*, 30*g*, 30*d*, 30*h*. For the data obtained using the AVCS illustrated in FIG. 7B, vibration sensors 30 used for AVCS control were located on the floor, measuring vibration and motion in the vertical direction at vibration sensors 30*c*, 30*g*, 30*d*, 30*h*, and on the pilot and co-pilot seats 60*a*, 60*b*, respectively, measuring vibration and motion in the fore-aft directions at the seat back 114 locations indicated by vibration sensors 30*a* and 30*e*, and measuring vibration and motion in the vertical directions at the seat pad 112 locations indicated by vibration sensors 3*b* and 30*f*.

Figure 8A:
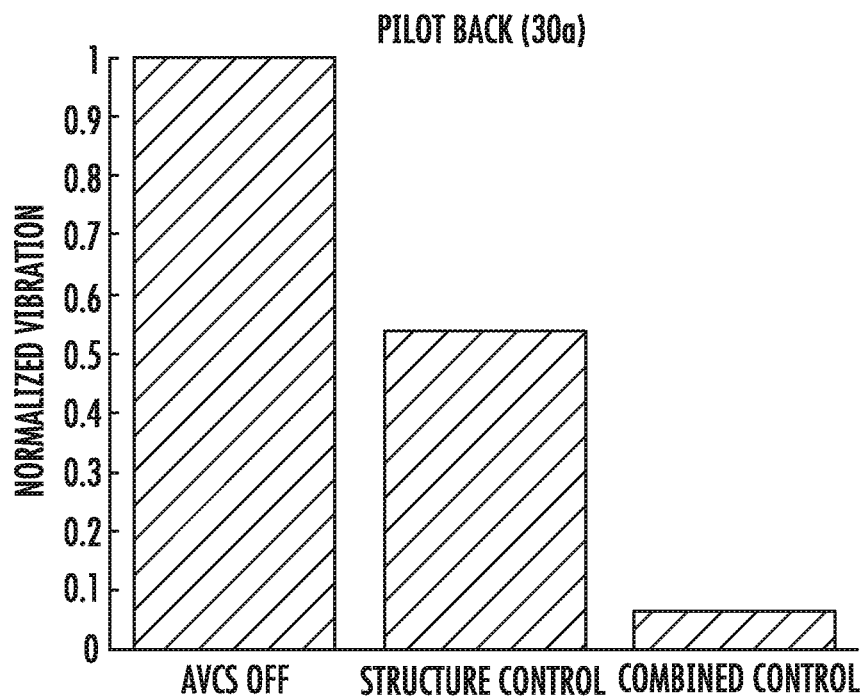
FIGS. 8A-8D are data plots of vibration at a single flight condition for a pilot seat and structure in an aircraft, according to the embodiment of FIGS. 7A and 7B.
Figure 9A:
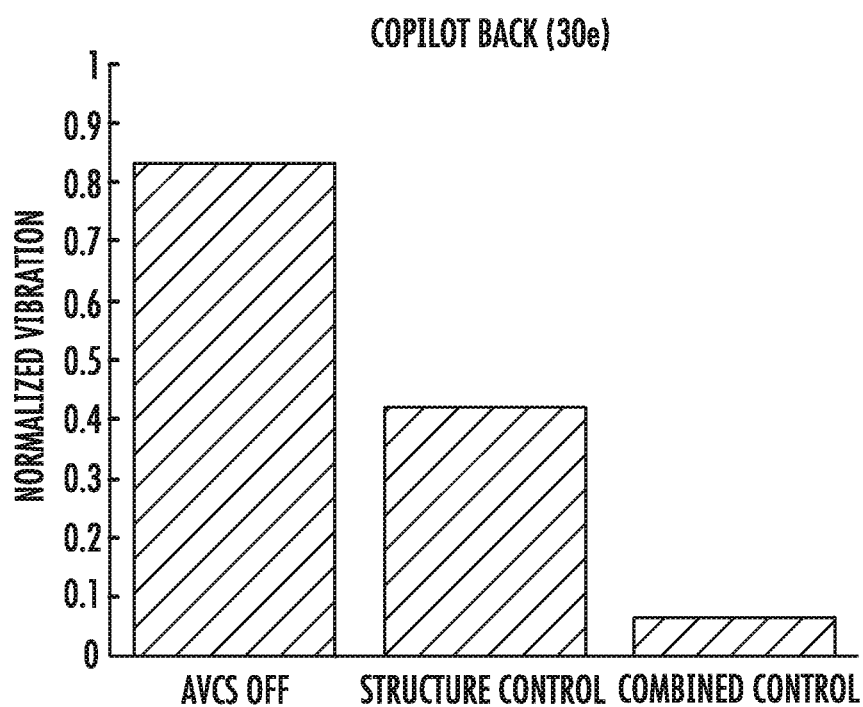
FIGS. 9A-9D are data plots of vibration at a single flight condition for a copilot seat and structure in an aircraft, according to the embodiment of FIGS. 7A and 7B.
Figure 8B:
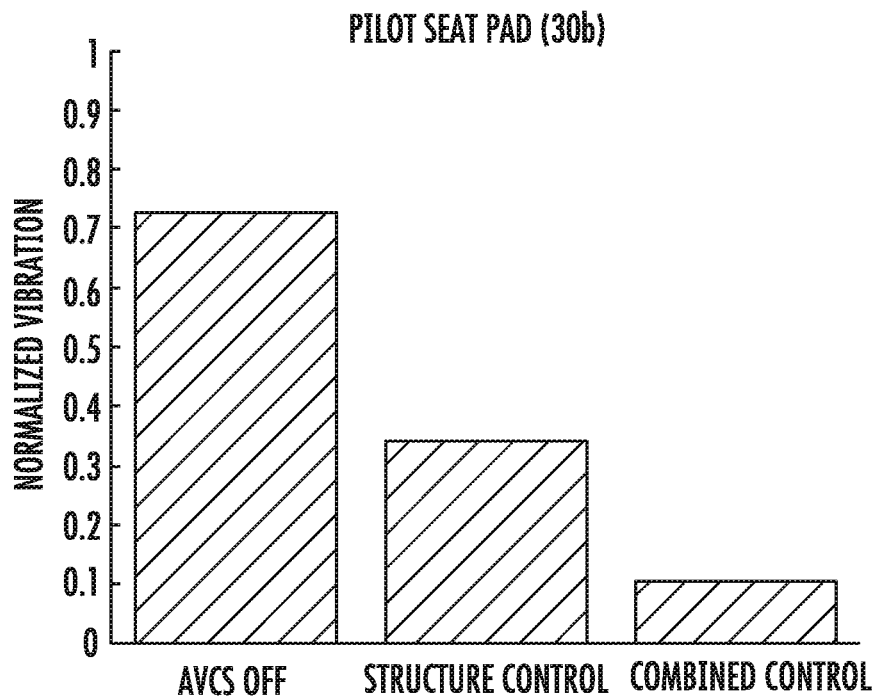
Figure 9B:
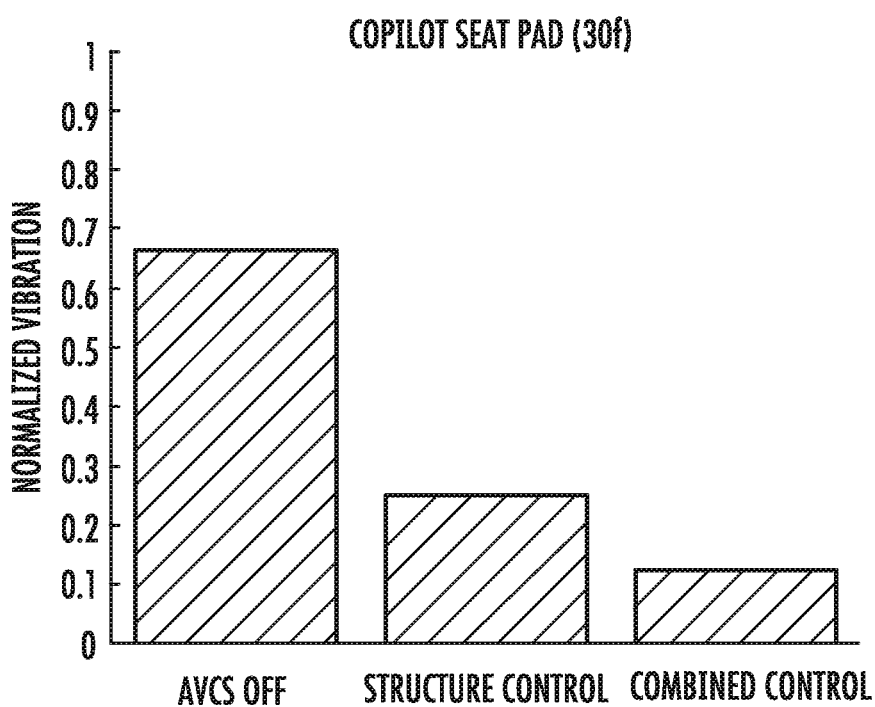
Figure 8C:
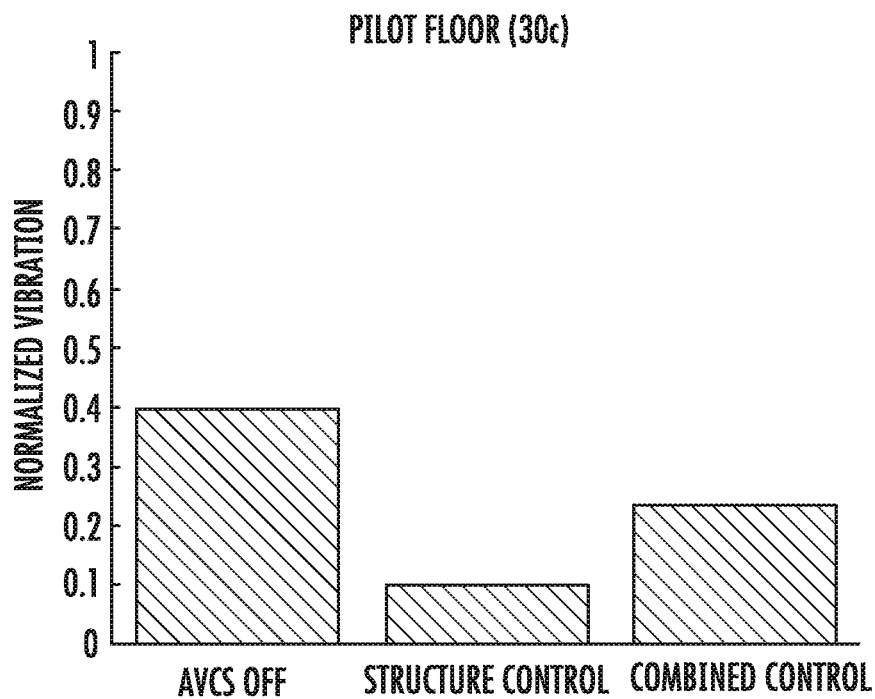
Figure 9C:
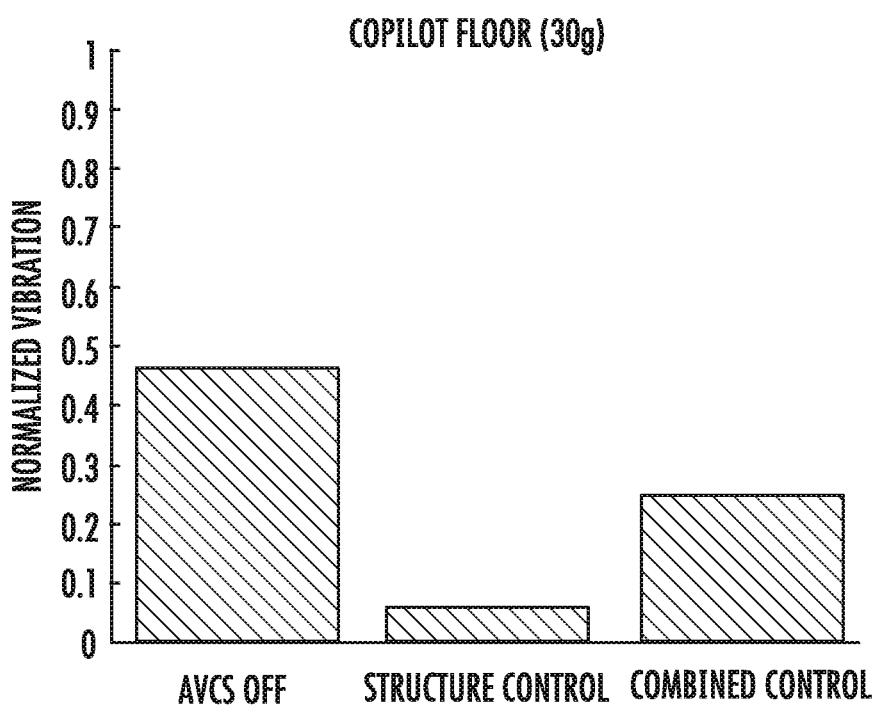
Figure 8D:
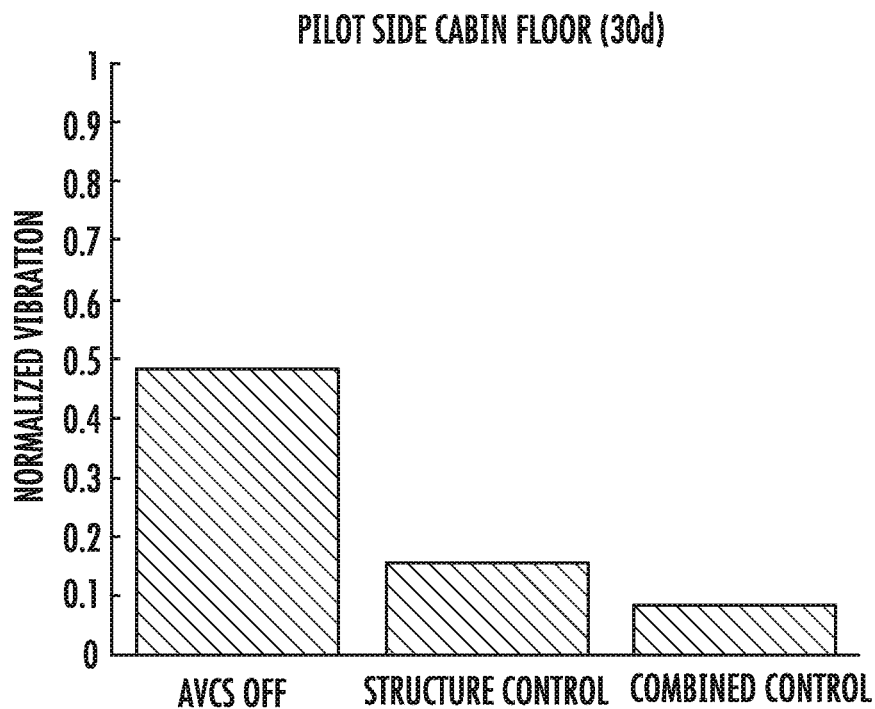
Figure 9D:
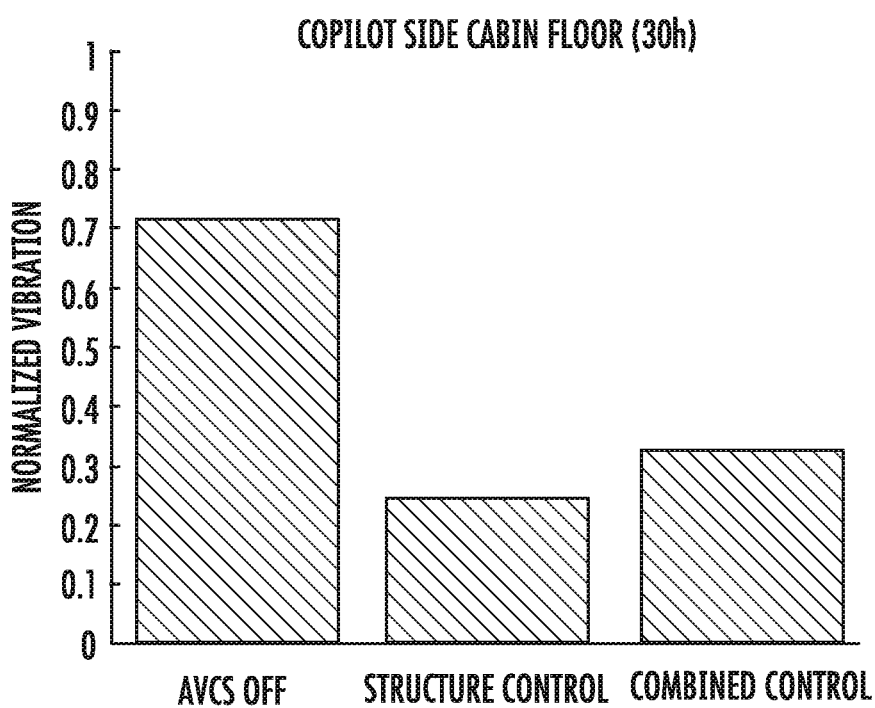

In FIGS. 8A and 9A, the vibration of the seat back 114 is shown for the pilot seat 60*a* and copilot seat 60*b* using vibration sensors 30*a*, 30*e*, illustrated in FIG. 7B. In FIGS. 8B and 9B, the vibration of the seat pad 112 is shown for pilot seat 60*a* and copilot seat 60*b* using vibration sensors 30*b*, 30*f*. In FIGS. 8C and 9C, the vibration of the floor is shown for the pilot and copilot seats 60*a*, 60*b*, respectively using vibration sensors 30*c*, 30*g*, illustrated in FIG. 7B. In FIGS. 8D and 9D, the vibration of the side cabin floor is shown for the pilot seat 60*a* and copilot seat 60*b* using vibration sensors 30*d*, 30*h* illustrated in FIG. 7B.

It can be seen in FIGS. 8A-9D that, while an AVCS using only floor-mounted vibration sensors 30 (structure control) provides good vibration reduction on the floor, the vibration reduction in seat 60 is not reduced nearly to the degree as the level of vibration in the floor. It can further be seen that an AVCS with seat and structure vibration control (combined control), such as is shown schematically in FIGS. 2B and 7B, using both floor and seat 60 based vibration sensors 30 provides the best vibration reduction, significantly reducing both the seat 60 and floor vibration levels.

Referring to the various embodiments discussed hereinabove and illustrated in the FIGS, the following embodiment includes an active vibration control system (AVCS) 100 for controlling motion and/or vibration of a seat 60 in a helicopter 10 having a structure 120 and at least one seat 60. The AVCS 100 comprises at least one controller 50, one or more force generators 40, and one or more sensors 30. The one or more force generators 40 are in electronic communication with the controller 50. The one or more sensors 30 are in electronic communication with the controller 50. In this arrangement, the one or more sensors 30 are attached to the structure 120 and/or to the at least one seat 60, wherein the one or more sensors 30 are configured to measure motion and/or vibration and to communicate a sensor data corresponding to the motion and/or vibration to the controller 50. In this arrangement, the controller 50 is configured to receive the sensor data from the one or more of sensors 30, to calculate a cancelling force for each of the one or more force generators 40 from the data received, and to electronically communicate a control signal to the one or more force generators 40. And, in this arrangement, each of the one or more force generators 40 is configured to generate, based on the control signal, the cancelling force to reduce a motion and/or vibration of the seat 60.

In addition to the foregoing embodiment, variations may include the following additional limitations individually or in combination. In such an embodiment, each of the one or more force generators 40 is configured to generate, based on the control signal, the cancelling force to reduce a motion and/or vibration of the structure 120. In this embodiment, the one or more sensors 30 are positioned on or in seat 60. The one or more sensors 30 positioned on or in seat 60 are positioned by selecting from a group consisting of being positioned on a seat frame 110, a seat side, on a seat back 114, on a seat pad 112, and combinations thereof. In an additional embodiment, the one or more sensors 30 are placed on a floor near seat 60 and the one or more force generators 40 are positioned on or in seat 60. In another embodiment, the one or more force generators 40 are positioned on seat frame 110 and the one or more force generators 40 are positioned on the floor near seat 60. In another embodiment, the one or more sensors 30 are positioned the on the floor and on or in seat 60 and the one or more force generators 40 positioned on the floor and on or in seat 60. The one or more sensors 30 are configured to measure motions of the seat 60, communicate the measured motions to the controller 50, and the controller 50 is configured to communicate a corrective force to the one or more force generators 40 to generate a cancelling force and to reduce or eliminate the measured motions. The controller 50 is configured to combine the measured motions and sensor data from the one or more vibration sensors 30 on and adjacent to seat 60, as well as on other structures within the helicopter 10, and wherein the controller 50 is configured to provide communicate a corrective force to the one or more force generators 40 to generate a cancelling force and to reduce or eliminate the measured motions for the entire helicopter 20.

The force generators 40 in foregoing embodiments may be circular force generators or linear force generators.

Referring to the foregoing embodiments, an additional embodiment includes AVCS 100 wherein seat 60 being controlled is selected from the group consisting of a pilot seat 60*a*, a copilot seat 60*b*, a passenger seat 60*c*, a luxury seat 60*d*, a medevac gurney 70, an attached structure, and combinations thereof. Further embodiments include two or more seats 60 being controlled simultaneously. The simultaneous control uses structure mounted force generators 40, seat mounted force generators 40, or a combination of the structure mounted force generators 40 and the seat mounted force generators 40.

The AVCS 100 in foregoing embodiments is configured to reduce vibrations in one or more seats 60 by a range of about 10% to about 90%, wherein the range of reduced vibrations is compared between the difference of the AVCS 100 control of seat 60 being turned on and being off. For example, the vibration levels may be reduced between about 10% to about 90%. Alternatively, the vibration levels may be reduced between about 20% to about 90%. In another alternative, the vibration levels may be reduced between about 40% to about 90%. In yet another alternative, the vibration levels may be reduced between about 50% to about 90%. In yet another alternative, the vibration levels may be reduced between about 60% to about 90%. The percentage of vibration reduction depends on many factors. In one regard, vibration reduction depends on how many control sensors and actuators are used. If the same number of sensors 30 is less than or equal to the number of force generators 40, then 100% or very close to 100% vibration reduction is possible. If the number of control sensors 30 is more than the number of force generators 40, then a range of vibration reductions is possible. Typically, it is preferable to use more sensors 30 than force generators 40 because it generally results in vibration that is well balanced at all locations, as well as being tolerant to a loss of one or more sensors. This is especially true for example for situations where there is a single force generator 40 that is trying to control both structure vibration as well as seat vibration. The exact amount of vibration reduction can be predicted from the vibration at the control sensors with AVCS turned OFF in combination with the transfer functions between the force generators 40 and sensors 30. Another factor on determining the percentage of vibration reduction is the amount of maximum force capability in the force generators 40. If the force generators 40 have a lower maximum force capability than the force required, then the vibration reduction will be lower than the predicted value. In this case, 20% is the lower limit as to what minimum vibration reduction is allowable in an active vibration control system. However, the limits are set by customer or performance requirements. As such the lower boundary can approach zero and the upper boundary can approach 100%. It will depend upon how much the customer wants to pay to reduce the last part of the vibration found on the seat.

The controller 50 in the foregoing embodiments is configured to estimate vibrations of seat 60 by having one or more sensors 30 positioned on the floor. In this embodiment, controller 50 is configured to provide corrective force commands to one or more force generators 40 positioned on the floor. The estimation of vibrations in the seat 60 is based upon the estimated motion of the seat 60, wherein the estimated motion includes pitch, roll, yaw, sway, vertical, lateral, and/or longitudinal motion.

In additional embodiments to the foregoing embodiments, controller 50 is configured to adjust the vibration control of seat 60 in any configuration, including the configuration when seat 60 is occupied, unoccupied, and/or when two or more seats 60 are mechanically coupled and at least one seat 60 is occupied and at least one seat 60 is unoccupied. In this embodiment, controller 50 is configured to sense a load and/or position of each seat 60, analyze the variability of the sensed load and/or position of each seat, and execute an automatic recalibration of at least one control parameter related to each seat 60. Controller 50 is configured to switch between two or more dynamic models based upon the sensed load or position of the seat 60. Controller 50 uses a vibration control algorithm to generate the control signal to the one or more force generators 40, the control signal is configured to account for the sensed load and position of the seat 60.

The AVCS 100 in foregoing embodiments includes an automatic recalibration procedure, wherein the automatic recalibration procedure is initiated when seat 60 is adjusted directly or indirectly beyond a pre-defined tolerance, wherein the seat 60 adjustment may be directly initiated by a seat occupant or indirectly by the mass of the occupant. The automatic recalibration procedure uses force generators 40 to stimulate seat 60 and/or seat frame 110 with a vibration to measure a dynamic response to the adjusted seat 60. In this embodiment, when an adjustment of the position of seat 60 from a nominal configuration changes a phase of seat 60 by 90 degrees or more, the automatic recalibration is initiated. In this embodiment, a switch is positioned on helicopter 10 near seat 60 that allows the seat occupant to initiate a recalibration procedure. In this embodiment, a pre-defined tolerance for each seat 60 is included, wherein the pre-defined tolerance is set during an initial set up of the AVCS 100 using a user defined maximum and minimum masses for seat occupants and a user defined baseline seat 60 configuration.

The controller 50 in the foregoing embodiments is configured to store for each occupant a preference for seat 60 configuration, wherein the occupant may enter their own information to include a maximum vibration, a minimum vibration, an occupant mass, a desired position of seat 60, and/or a plurality of desired positions for seat 60.

Figure 13:
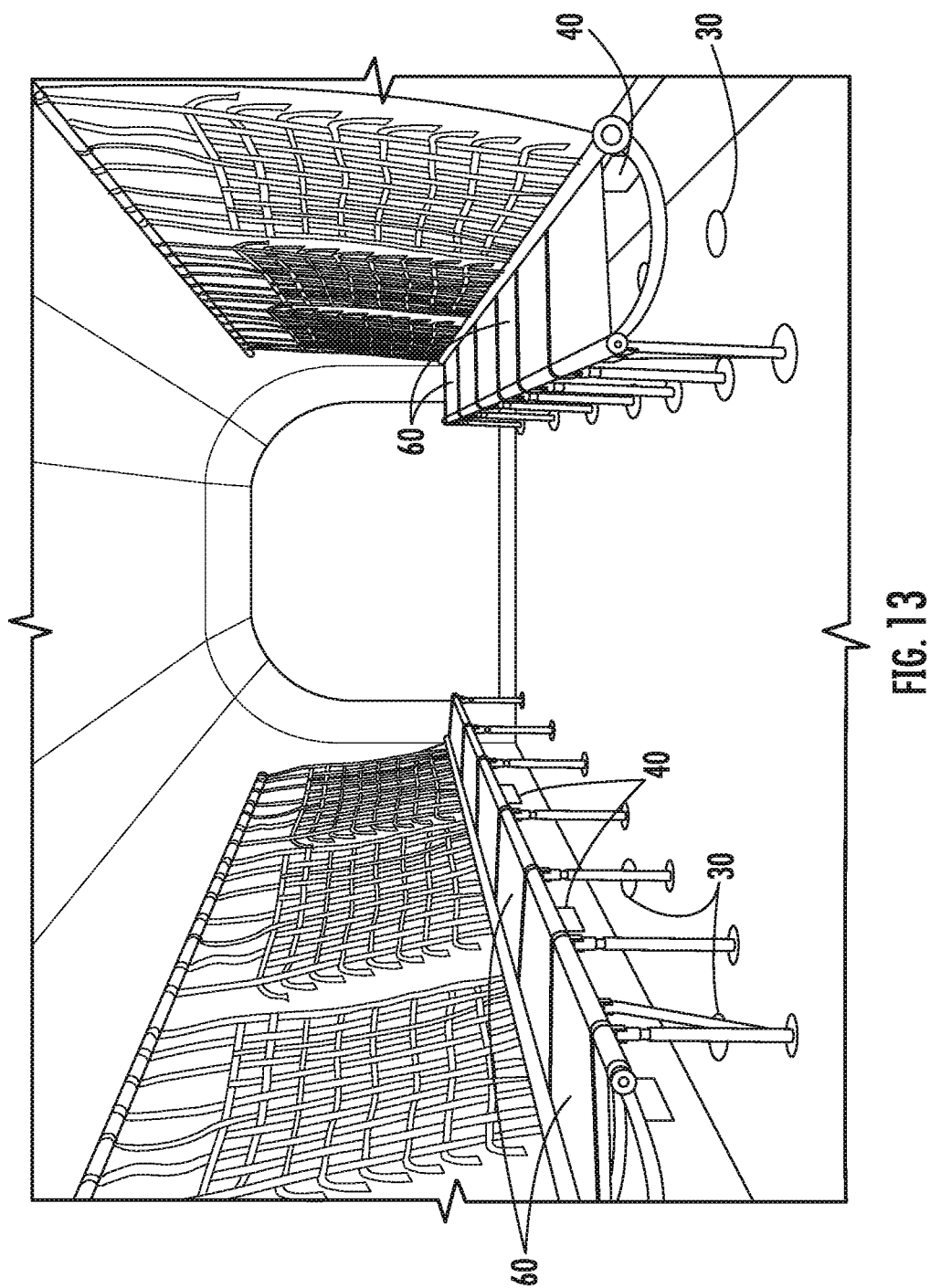

Referring to FIGS. 10-13, various embodiments illustrating the seat motion/vibration control on fixed wing and rotary wing aircraft are illustrated. In FIG. 10, a seat configuration in a multi-engine turboprop aircraft is illustrated with seating for multiple personnel on either side. In FIG. 10, the seats 60 are several seats 60 joined together an affixed to both the floor and the structure 120 on both sides of the cargo area of the aircraft. Similarly, FIG. 11A illustrates a multi-engine jet transport aircraft with seats 60 joined together in modules and affixed to both the floor and the structure 120 on both sides of the cargo area of the aircraft, as well as having a center set of modular seats affixed to the floor along the middle of the aircraft cargo area. In an alternative view of FIG. 11A, FIG. 11B illustrates center seats 60 configured as typical airline seats in a module of five seats 60 across with the seats 60 affixed to the floor of the cargo area of the aircraft. In addition to the airline style seating, FIG. 11B also illustrates the modular side seats 60 affixed to both the floor and the structure 120 on both sides of the cargo area of the aircraft. Referring to FIG. 12A, center mounted modular seats 60 are illustrated affixed to the floor and ceiling of a helicopter cargo area. Referring to FIG. 12B, an alternative configuration of seat 60 mounting illustrates wall mounted modular seats 60 are illustrated affixed to the floor and wall/ceiling of a helicopter cargo area. Referring to FIG. 13, wall mounted seats on both sides of a larger transport helicopter are illustrated. In FIGS. 10-13, all of the various floor or seat 60 configurations for mounting sensors 30 and force generators 40 previously discussed and illustrated in FIGS. 2A-7B are applicable. Thus, sensors 30 and force generators 40 may be mounted or affixed to either the floor or seat (60). What is shown in FIGS. 10-13 is a single, non-limiting example of sensors 30 and force generators 40 mounted to the floor or seat 60 based upon the configurations found in FIGS. 3-7B.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. An active vibration control system (AVCS) for controlling motion and/or vibration of at least one seat attached to an aircraft structure, the AVCS comprising:
   at least one controller:
   one or more force generators attached to the at least one seat, to a floor near the at least one seat, and/or the aircraft structure, wherein the one or more force generators are in electronic communication with the controller; and
   one or more sensors in electronic communication with the controller;
   wherein the one or more sensors are attached on, in, and/or to the at least one seat;
   wherein the one or more sensors are configured to measure motion and/or vibration and to communicate a sensor data corresponding to the motion and/or the vibration to the controller;
   wherein the controller is configured to receive the sensor data from the one or more sensors, to calculate a cancelling force for each of the one or more force generators from the data received, and to electronically communicate a control signal to the one or more force generators;
   wherein each of the one or more force generators is configured to generate the cancelling force to reduce a motion and/or vibration of the at least one seat, the floor near the at least one seat, and/or the aircraft structure;
   wherein the cancelling force is based on the control signal.

2. The AVCS in claim 1, wherein the one or more sensors is a plurality of sensors, at least one of which is attached on and/or to the floor near the at least one seat and/or the aircraft structure for controlling motion and/or vibration of the at least one seat and one or both of the floor near the at least one seat and the aircraft structure.

3. The AVCS in claim 1, wherein the one or more sensors on, in, and/or to the seat is on a structure of the at least one seat selected from a group consisting of a seat frame, a seat side, a seat back, a seat pad, and combinations thereof.

4. The AVCS in claim 1, comprising a further at least one sensor on the floor near the at least one seat.

5. The AVCS in claim 1, wherein at least one force generator of the one or more force generators is on or in the at least one seat.

6. The AVCS in claim 5, wherein the at least one force generators is on the seat frame.

7. The AVCS in claim 1, wherein the one or more force generators is a plurality of force generators, one or more of which is on the floor near the at least one seat.

8. The AVCS in claim 7, wherein the one or more sensors are configured to measure motions of the seat and communicate the measured motions to the controller, and wherein the controller is configured to communicate the control signal to the one or more force generators to generate the cancelling force and to reduce or eliminate the measured motions.

9. The AVCS in claim 8, wherein the measured motions include pitch, roll, yaw, sway, vertical, lateral, and/or longitudinal motion.

10. The AVCS in claim 1, wherein the one or more force generators are one or more circular force generators or one or more linear force generators.

11. The AVCS in claim 1, wherein the seat being controlled is selected from the group consisting of a pilot seat, a copilot seat, a passenger seat, a luxury seat, a medevac gurney, an attached structure, and combinations thereof.

12. The AVCS in claim 11, wherein the controller is configured to control vibration and/or motion of two or more seats simultaneously.

13. The AVCS in claim 12, wherein, for controlling vibration and/or motion of the two or more seats simultaneously, the one or more force generators comprises a structure mounted force generator, a seat mounted force generator, or a combination of the structure mounted force generators and the seat mounted force generators.

14. The AVCS in claim 1, wherein the AVCS is configured to reduce vibrations in the seat by a range of about 10% to about 90%, wherein the range of reduced vibrations is compared between the difference of the AVCS control of the seat being turned on and being in an off state.

15. The AVCS in claim 4, wherein the controller is configured to estimate vibrations of the at least one seat using the further at least one sensor on the floor, wherein at least one force generator of the one or more force generators is on the floor, and wherein the controller is configured to provide corrective force commands to the at least one force generators that is on the floor.

16. The AVCS in claim 15, wherein the estimation of vibrations in the at least one seat is based upon an estimated motion of the at least one seat, the estimated motion including pitch, roll, yaw, sway, vertical, lateral, and/or longitudinal motion.

17. The AVCS in claim 1, wherein the controller is configured to adjust the vibration control of the seat in any configuration, including a configuration when the seat is occupied, a configuration when the seat is unoccupied, and/or when the at least one seat is two or more seats that are mechanically coupled together, at least one of the two or more seats being occupied and at least one of the two or more seats being unoccupied.

18. The AVCS in claim 17, wherein the controller is configured to sense a load and/or position of each seat, analyze the variability of the sensed load and/or position of each seat, and execute an automatic recalibration of at least one control parameter related to each seat.

19. The AVCS in claim 18, wherein the controller is configured to switch between two or more dynamic models based upon the sensed load or position of the seat.

20. The AVCS in claim 19, wherein the controller uses a vibration control algorithm to generate the control signal to the one or more force generators, the control signal being configured to account for the sensed load and position of the seat.

21. The AVCS in claim 1, wherein the controller is configured to perform an automatic recalibration procedure, wherein the automatic recalibration procedure is initiated when the seat is adjusted directly or indirectly beyond a pre-defined tolerance, wherein the seat adjustment may be directly initiated by a seat occupant or indirectly by the mass of the occupant.

22. The AVCS in claim 21, wherein the automatic recalibration procedure uses the force generators to stimulate the seat and/or the seat frame with a vibration to measure a dynamic response to the adjusted the seat.

23. The AVCS in claim 22, wherein an adjustment of a position of the seat from a nominal configuration changes a phase of the seat by ±90 degrees, the automatic recalibration is initiated.

24. The AVCS in claim 23, further comprising a switch positioned on the aircraft near the seat that allows the seat occupant to initiate a recalibration procedure.

25. The AVCS in claim 24, wherein there is a pre-defined tolerance for each seat, wherein the pre-defined tolerance is set during an initial set up of the AVCS using a user defined maximum and minimum masses for seat occupants and a user defined baseline seat configuration.

26. The AVCS in claim 1, wherein the controller is in electronic communication with at least one avionic component of the aircraft, wherein the at least one avionic component is configured to communicate at least one operational condition associated with the aircraft, and wherein the controller is configured to monitor at least one avionic component and adjust the control signal to account for the operational condition of the aircraft while the aircraft is flying.

27. The AVCS in claim 26, wherein the controller uses a vibration control algorithm to generate the control signal to the one or more force generators, wherein the controller is configured to electronically communicate with a data controller associated with the aircraft, the controller being configured to obtain from the data controller at least one aircraft performance data associated with the aircraft, and wherein the at least one aircraft performance data is used by the controller to adjust the control signal sent to the one or more force generators.

28. The AVCS in claim 27, wherein the at least one aircraft performance data includes altitude, orientation, gross weight, and/or vibration.

29. The AVCS in claim 26, wherein the controller is configured to use at least one control system parameter to update an input to the vibration control algorithm, wherein the controller is configured to use the updated vibration control algorithm to calculate and communicate an updated cancelling force command to the one or more force generators based on the at least one aircraft performance data, and wherein the at least one control system parameter comprises sensor weighting, actuator weighting, convergence rate, and/or dynamic response model.

30. The AVCS in claim 1, wherein the controller is configured to store for each occupant a preference for configuration of the seat, and wherein an occupant of the seat may enter their own preferences to include a maximum vibration, a minimum vibration, an occupant mass, a desired position of the seat, and/or a plurality of desired positions for the seat.

31. The AVCS in claim 1, wherein the controller is collocated with the one or more force generators and the one or more sensors on a same seat of the at least one seat.

32. The AVCS in claim 31, wherein the at least one seat is a plurality of seats, and wherein the at least one controller comprises a plurality of controllers, each of which are collocated with a corresponding force generator of the one or more force generators and a corresponding sensor of the one or more sensors on a same seat of the plurality of seats.

33. The AVCS in claim 31, wherein either the one or more sensors and/or the one or more force generators are in a single unit with the controller.

34. An active vibration control system (AVCS) for controlling motion and/or vibration of a seat attached to a structure of an aircraft, the AVCS comprising:
   at least one controller;
   at least one force generator attached to the seat, to a floor near the seat, and/or to the aircraft structure wherein the at least one force generator is in electronic communication with the controller;
   at least one sensor attached to the seat wherein the at least one sensor is in electronic communication with the controller, and wherein the at least one sensor is configured to measure motion and/or vibration and to communicate a sensor data corresponding to the motion and/or vibration to the controller;
   wherein the controller is configured to receive the sensor data from the at least one sensor, to calculate a cancelling force for each force generator of the at least one force generator from the sensor data received, and to electronically communicate a control signal to the at least one force generator; and
   wherein each force generator of the at least one force generator is configured to generate, based on the control signal, the cancelling force to reduce motion and/or vibration of the seat, the floor near the seat, and/or the aircraft structure.

35. A method for controlling motion and/or vibration of a seat attached to a structure of an aircraft, the method comprising:
   sensing, using one or more sensors attached to the seat, the motion and/or vibration of the seat;
   providing a controller in electronic communication with the one or more sensors;
   receiving, at the controller, a sensor data from the one or more sensors;
   calculating, using the controller, a vibration cancelling force;
   communicating a control signal containing at least a phase and a magnitude of the vibration cancelling force to one or more force generators attached to the seat, to the floor near the seat and/or to the aircraft structure; and
   using the at least one force generator to impart the vibration cancelling force, based on the control signal, to the seat, the floor near the seat, and/or the aircraft structure to reduce the motion and/or vibration of the seat.

36. The method in claim 35, wherein the one or more sensors is a plurality of sensors, at least one of which is attached on and/or to the floor near the at least one seat and/or the aircraft structure for controlling motion and/or vibration of the seat and one or both of the floor near the seat and the aircraft structure.

37. The AVCS (100) in claim 34, wherein the at least one sensor is a plurality of sensors, at least one of which is attached on and/or to the floor near the at least one seat and/or the aircraft structure for controlling motion and/or vibration of the at least one seat and one or both of the floor near the at least one seat and the aircraft structure.

* * * * *